United States Patent
Sato et al.

(10) Patent No.: US 9,954,925 B2
(45) Date of Patent: Apr. 24, 2018

(54) TRANSMISSION DEVICE, TRANSMISSION METHOD, RECEPTION DEVICE, RECEPTION METHOD, PROGRAM, STREAM TRANSMISSION AND RECEPTION SYSTEM, AND ELECTRONIC APPARATUS

(71) Applicant: Saturn Licensing LLC, New York, NY (US)

(72) Inventors: Masahiko Sato, Tokyo (JP); Kazutoyo Sekine, Tokyo (JP); Tamotsu Ikeda, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 144 days.

(21) Appl. No.: 14/130,563

(22) PCT Filed: Mar. 15, 2013

(86) PCT No.: PCT/JP2013/057561
§ 371 (c)(1),
(2) Date: Jan. 2, 2014

(87) PCT Pub. No.: WO2013/168469
PCT Pub. Date: Nov. 14, 2013

(65) Prior Publication Data
US 2014/0164565 A1 Jun. 12, 2014

(30) Foreign Application Priority Data

May 10, 2012 (JP) .................................. 2012-108767

(51) Int. Cl.
*H04L 29/06* (2006.01)
*H04L 9/12* (2006.01)
(Continued)

(52) U.S. Cl.
CPC .............. *H04L 65/608* (2013.01); *H04L 9/12* (2013.01); *H04N 21/2347* (2013.01);
(Continued)

(58) Field of Classification Search
CPC ....................................................... H04L 65/608
(Continued)

(56) References Cited

U.S. PATENT DOCUMENTS 6,678,740 B1 * 1/2004 Rakib .............. G08B 13/19656
348/E7.069
6,804,259 B1 10/2004 Onagawa
(Continued)

FOREIGN PATENT DOCUMENTS

CN 101262573 A 9/2008
EP 1921857 A1 5/2008
(Continued)

OTHER PUBLICATIONS

Extended European Search Report for EP Application No. 13787256.0, dated Mar. 27, 2015.
(Continued)

*Primary Examiner* — Hua Fan
*Assistant Examiner* — Sibte Bukhari
(74) *Attorney, Agent, or Firm* — Lerner, David, Littenberg, Krumholz & Mentlik, LLP

(57) ABSTRACT

Provided is a transmission device including a stream input unit configured to input a plurality of streams each constituted of continuous packets, a stream synthesizing unit configured to synthesize the plurality of input streams to obtain one stream, and a stream transmission unit configured to transmit the one obtained stream. The stream synthesizing unit encodes at least a typical pattern portion of each packet of the plurality of streams using keys that are intrinsic to the respective streams for separation of packets of each stream
(Continued)

on a reception side, and thereafter performs time-division multiplexing on the packets of the plurality of streams to obtain the one stream.

25 Claims, 14 Drawing Sheets

(51) Int. Cl.
  *H04N 21/2347* (2011.01)
  *H04N 21/236* (2011.01)
  *H04N 21/2365* (2011.01)
  *H04N 21/418* (2011.01)
  *H04N 21/426* (2011.01)
  *H04N 21/434* (2011.01)
  *H04N 21/436* (2011.01)
  *H04N 21/4385* (2011.01)
  *H04N 21/4405* (2011.01)

(52) U.S. Cl.
  CPC ... *H04N 21/2365* (2013.01); *H04N 21/23608* (2013.01); *H04N 21/4181* (2013.01); *H04N 21/4263* (2013.01); *H04N 21/42615* (2013.01); *H04N 21/42623* (2013.01); *H04N 21/4343* (2013.01); *H04N 21/4347* (2013.01); *H04N 21/43607* (2013.01); *H04N 21/43853* (2013.01); *H04N 21/4405* (2013.01)

(58) Field of Classification Search
  USPC ........................................ 709/217
  See application file for complete search history.

(56) References Cited

U.S. PATENT DOCUMENTS

| | | | |
|---|---|---|---|
| 7,394,834 B2 | 7/2008 | Milner | |
| 7,508,454 B1* | 3/2009 | Vantalon | H04N 21/42623 348/385.1 |
| 2003/0123662 A1 | 7/2003 | Jo et al. | |
| 2004/0008792 A1* | 1/2004 | Andres | H03M 5/04 375/259 |
| 2005/0166050 A1 | 7/2005 | Kosaki | |
| 2008/0165962 A1 | 7/2008 | Kawano et al. | |
| 2008/0218637 A1 | 9/2008 | Hayashi et al. | |
| 2009/0287839 A1* | 11/2009 | Fallon | G06Q 40/04 709/231 |
| 2011/0199243 A1 | 8/2011 | Fallon et al. | |

FOREIGN PATENT DOCUMENTS

| | | |
|---|---|---|
| JP | 8-331544 A | 12/1996 |
| JP | 09511369 A | 11/1997 |
| JP | 2000217067 A | 8/2000 |
| JP | 2000-312221 A | 11/2000 |
| JP | 2002281476 A | 9/2002 |
| JP | 2003174620 A | 6/2003 |
| JP | 2008-098970 A | 4/2008 |
| JP | 2008098970 A | 4/2008 |
| JP | 2008-172391 A | 7/2008 |
| KR | 20060032129 A | 4/2006 |
| WO | 0137562 A1 | 5/2001 |
| WO | 2004105308 A1 | 12/2004 |

OTHER PUBLICATIONS

Chinese Office Action for Application No. 2013800019355, dated Oct. 9, 2016.
Japanese Office Action for Application No. 2013555491, dated Jan. 17, 2017.
Chinese Office Action for Application No. 201380001935.5 dated Oct. 8, 2017.
International Search Report for Application No. PCT/JP2013/057561 dated May 28, 2013, 2 pages.

* cited by examiner

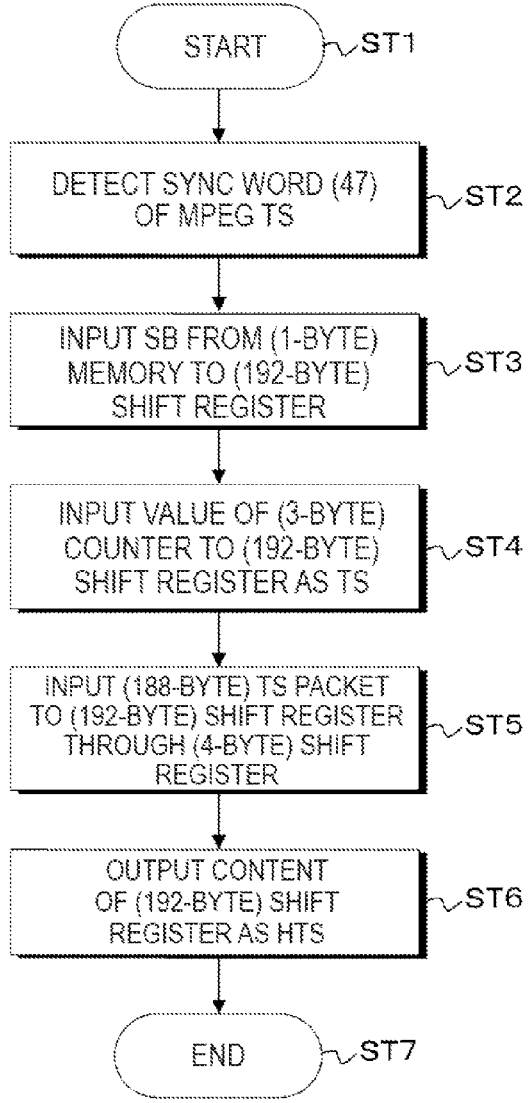
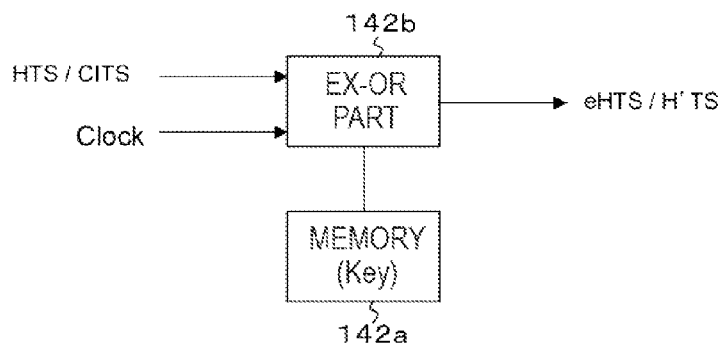

FIG. 6
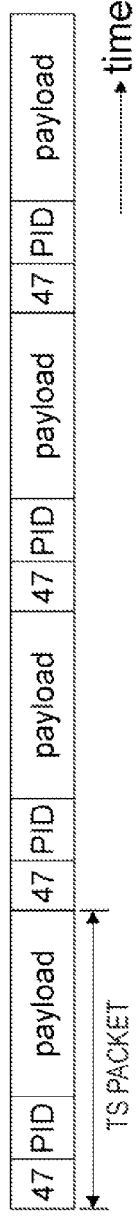
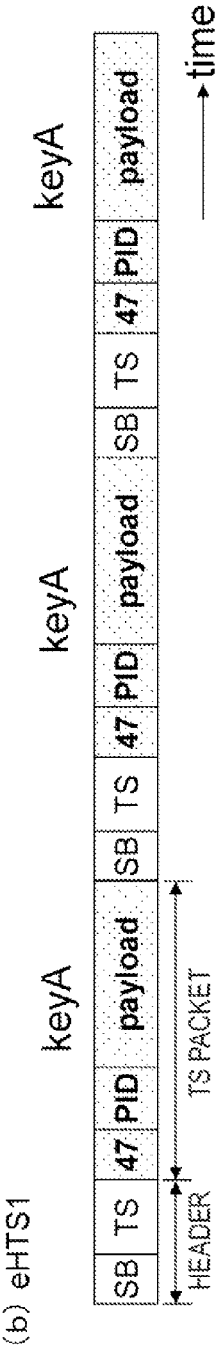
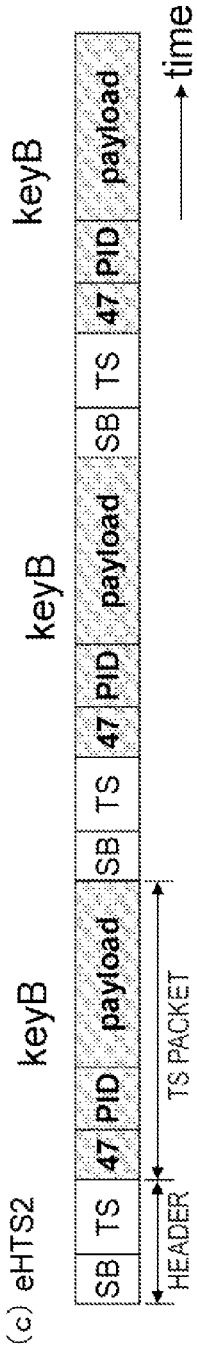
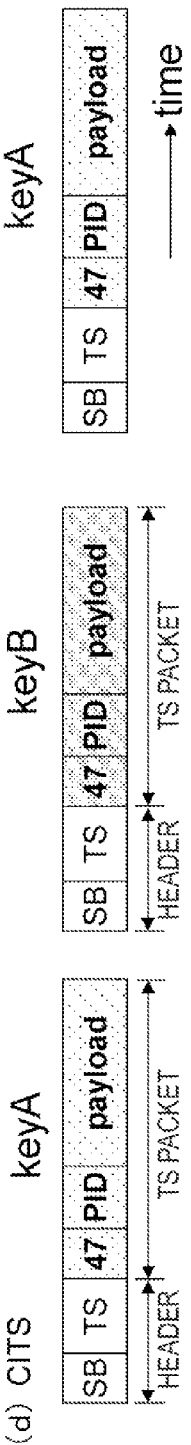

TRANSMISSION DEVICE, TRANSMISSION METHOD, RECEPTION DEVICE, RECEPTION METHOD, PROGRAM, STREAM TRANSMISSION AND RECEPTION SYSTEM, AND ELECTRONIC APPARATUS

CROSS-REFERENCE TO RELATED APPLICATION

The present application is a national phase entry under 35 U.S.C. § 371 of International Application No. PCT/JP2013/057561 filed Mar. 15, 2013, published on Nov. 14, 2013 as WO 2013/168469 A1, which claims priority from Japanese Patent Application No. JP 2012-108767 filed in the Japanese Patent Office on May 10, 2012.

TECHNICAL FIELD

The present technology relates to a transmission device, a transmission method, a reception device, a reception method, a program, a stream transmission and reception system, and an electronic apparatus, and particularly to a transmission device and the like which can synthesize a plurality of streams and then satisfactorily transmit the streams as one stream to an external device.

BACKGROUND ART

A set of standards (EN 50221) of using conditional access (CA) implemented in a module via a common interface (CI) has been issued and used in order to deal with conditional access of different paths at the time of receiving a television broadcast.

FIG. 13 illustrates a configuration example of a reception system 300 in digital broadcasting based on the set of standards (EN 50221). The reception system 300 is constituted of a host device 310 and a CAM module 302.

The host device 310 is a television receiver set (TV set), a set-top box, or the like. The host device 310 has a microprocessor 311, a tuner 312, and a demodulator 313. In addition, the host device 310 has a demultiplexer 314 and an MPEG decoder 315. Operations of each of the units of the host device 310 are controlled by the microprocessor 311.

The CAM module 320 is an attachment device for performing a descrambling process which fits into a DVB-CI common interface connector of the host device 310. The CAM module 320 is used by inserting a smart card 330 such as a magnetic card or an IC card in which subscriber information, subscription contract period information, and the like are recorded into the CAM module. The CAM module 320 has a microprocessor 321 and a descrambler 322. Operations of each of the units of the CAM module 320 are controlled by the microprocessor 321.

The tuner 312 of the host device 310 receives RF modulated signals of transport streams TS transmitted from a broadcasting station. In addition, the RF modulated signals are down-converted in the tuner 312 so as to have an intermediate frequency (IF) and then output so as to be input to the demodulator 313. The demodulator 313 demodulates the IF modulated signals that have been down-converted so as to have the intermediate frequency, and thereby a transport stream TS of a baseband is obtained. The transport stream TS is transmitted to the CAM module 320 via the DVB-CI common interface.

The CAM module 320 receives the transport stream TS transmitted from the host device 310 via the DVB-CI common interface, and then the descrambler 322 performs a descrambling process on the transport stream. Then, the CAM module 320 transmits the descrambled transport stream TS to the host device 310 via the DVB-CI common interface.

The host device 310 receives the transport stream TS transmitted from the CAM module 320 via the DVB-CI common interface. The demultiplexer 314 extracts video and audio PID data packets of a selected (tuned) service channel from the received transport stream TS. The MPEG decoder 315 decodes an elementary stream constituted of the PID data packets extracted by the demultiplexer 314, thereby obtaining video data and audio data.

FIG. 14 illustrates a configuration example of a PVR (Personal Video Recorder) 400 with which taping and viewing can be performed at the same time. The PVR 400 has a controller 401, tuners 402-1 and 402-2, demultiplexers 403-1 and 403-2, a storage 404, a changeover switch 405, and an MPEG decoder 406. Operations of each of the units of the PVR 400 are controlled by the controller 401. Here, the tuners 402-1 and 402-2 correspond respectively to the tuner 312 and the demodulator 313 of the host device 310 of FIG. 13.

The tuners 402-1 and 402-2 respectively receive RF modulated signals of transport streams TS1 and TS2 transmitted from a broadcasting station. In addition, the tuners 402-1 and 402-2 down-convert the RF modulated signals so as to have an intermediate frequency (IF), and then demodulate the IF modulated signals, thereby obtaining the transport streams TS1 and TS2 of a baseband.

The demultiplexers 403-1 and 403-2 respectively extract video and audio PID data packets of a selected (tuned) service channel from the transport streams TS1 and TR2. The video and audio PID data packets extracted by the demultiplexer 403-1 are input to the side of the changeover switch 405. On the other hand, the video and audio PID data packets extracted by the demultiplexer 403-2 are input to the storage 404. The video and audio PID data packets of the predetermined service channel reproduced from the storage 404 are input to the b side of the changeover switch 405.

During taping and viewing in which taping and viewing are performed at the same time, the video and audio PID data packets extracted by the demultiplexer 403-2 are recorded in the storage 404. In addition, in this case, the changeover switch 405 is connected to the side, and the video and audio PID data packets extracted by the demultiplexer 403-1 are selectively extracted. Then, the MPEG decoder 406 decodes an elementary stream constituted of the PID data packets, thereby obtaining video data and audio data.

In addition, during reproduction, the PID data packets of the predetermined service channel are reproduced from the storage 404. In addition, in this case, the changeover switch 405 is connected to the b side, and the video and audio PID data packets reproduced from the storage 404 are selectively extracted. Then, the MPEG decoder 406 decodes an elementary stream constituted of the PID data packets, thereby obtaining video data and audio data.

When the technology of the set of the standards (EN 50221) described above is applied to the PVR 400 by which taping and viewing can be performed at the same time, using two CAM modules is considered. However, since using two CAM modules is possible but uneconomic, it is desirable to enable one CAM module to descramble two transport streams TS1 and TS2 at the same time as in the principle illustrated in FIG. 15.

However, according to the set of standards (EN 50221), since there is only one interface each of transport streams that can be used on a common interface (CI) for input and output, it is necessary to perform time-division multiplexing on TS packets of two transport streams and to make one stream. For example, Patent Literature 1 discloses that time-division multiplexing is performed on TS packets of two transport streams so as to make one stream, and thereby the stream is transmitted between a host device and a CAM module connected by a common interface (CI).

CITATION LIST

Patent Literature

Patent Literature 1: Specification of U.S. Pat. No. 7,394,834

SUMMARY OF INVENTION

Technical Problem

When TS packets of two transport streams simply undergo time-division multiplexing to be transmitted as one stream, the following problem is anticipated. In other words, there is a critical problem that PIDs (Packet IDs) of TS packets are intrinsically included only in transport streams. Therefore, there is concern that a reception side is not able to separate the one stream into the two transport streams merely using PIDs as an index.

It is desirable to enable a reception side to simply and reliably acquire a plurality of original streams when the plurality of streams are synthesized and transmitted as one stream.

Solution to Problem

According to an embodiment of the present technology, there is provided a transmission device including a stream input unit configured to input a plurality of streams each constituted of continuous packets, a stream synthesizing unit configured to synthesize the plurality of input streams to obtain one stream, and a stream transmission unit configured to transmit the one obtained stream. The stream synthesizing unit encodes at least a typical pattern portion of each packet of the plurality of streams using keys that are intrinsic to the respective streams for separation of packets of each stream on a reception side, and thereafter performs time-division multiplexing on the packets of the plurality of streams to obtain the one stream.

According to the embodiment of the present technology, the stream input unit inputs transport streams each including PID data packets of a plurality of service channels in a time dividing manner, and the stream synthesizing unit synthesizes the plurality of streams. For example the streams may be transport streams, and the packets may be transport stream packets each of which has a sync word as a typical pattern portion in its head.

The stream transmission unit transmits one stream that is obtained by the stream synthesizing unit. For example, the stream transmission unit may be set to transmit the one stream to an external device via a digital interface.

The stream synthesizing unit encodes at least a typical pattern portion of the packets of the plurality of streams using keys that are intrinsic to the respective streams, the packets of the plurality of streams are thereafter time-division multiplexed and thereby the one stream is obtained. In this case, encoding the packets of each stream is performed for separation of the packets of each stream on the reception side.

According to the embodiment of the present technology, at least the typical pattern portion of the packets of the plurality of streams that are time-division multiplexed to be the one stream is encoded using the keys that are intrinsic to the respective streams, and the reception side can simply and reliably acquire the plurality of original streams from the one stream.

Note that, according to the embodiment of the present technology, for example, the stream synthesizing unit may further be set to add a header that includes a sync byte to each packet of the plurality of streams. In this case, even when the typical pattern portion of each packet of the one stream, for example, the sync byte (sync word) of the head is encoded, the reception side can detect and process each packet included in the one stream.

In addition, according to the embodiment of the present technology, for example, the stream synthesizing unit may further be set to cause the header added to each packet of the plurality of streams to include a time stamp corresponding to an input time of the packet. In this case, the reception side can restore a timing of each packet of the plurality of streams to the original timing on the transmission side.

According to another embodiment of the present technology, there is provided a reception device including a stream reception unit configured to receive one stream that is obtained by performing time-division multiplexing on packets of a plurality of streams, a stream separation unit configured to separate the one received stream to obtain the plurality of streams, and a stream output unit configured to output the plurality of obtained streams. At least a typical pattern portion of each packet of the plurality of streams constituting the one stream is encoded using keys that are intrinsic to the respective streams. The stream separation unit decodes an encoded portion of each packet of the one stream using the keys that are intrinsic to the plurality of respective streams, and thereafter discards a packet whose typical pattern portion has not been correctly decoded, thereby obtaining the plurality of streams.

According to another embodiment of the present technology, the stream reception unit receives the one stream obtained by performing time-division multiplexing on the packets of the plurality of streams. At least the typical pattern portion of each packet of the plurality of streams constituting the one stream is encoded using the keys that are intrinsic to the respective streams. The stream reception unit may be, for example, set to receive the one stream from an external device via a digital interface. In this case, the digital interface may be, for example, a DVB-CI common interface.

The stream separation unit separates the one stream received by the stream reception unit to obtain the plurality of streams, and the stream output unit outputs the streams. The stream separation unit obtains the plurality of streams by performing a decoding process on the one stream using the keys that are intrinsic to the plurality of respective streams.

In this case, the encoded portion of each packet of the one stream is decoded, only the encoded portion of each packet of each stream that has been encoded with the same key is correctly decoded, and the typical pattern portion is also correctly decoded. The stream separation unit further discards a packet whose typical pattern portion has not been correctly decoded from the plurality of streams that have undergone the decoding process, thereby obtaining the plurality of final streams.

According to the embodiment of the present technology, the encoded portion of each packet of the one stream is decoded using the keys that are intrinsic to the plurality of respective streams, the packet of which the typical pattern portion has not been correctly decoded is thereafter discarded, then the plurality of streams are obtained, and thereby the plurality of original streams can be simply and reliably acquired from the one stream.

Note that, according to the embodiment of the present technology, for example, a header that at least includes a sync byte may be added to each packet of the one stream, and the stream separation unit may be set to detect and process each packet included in the one stream based on the sync byte. In this case, even when the typical pattern portion of each packet of one stream, for example, the sync byte (sync word) of the head, is encoded, each packet included in the one stream can be detected and processed.

In addition, according to the embodiment of the present technology, for example, the header added to each packet of the one stream may further include a time stamp, and the stream separation unit may be set to restore a timing of each packet included in the plurality of streams that have undergone the packet discarding based on the time stamp. In this case, the timing of each packet of the plurality of streams can be restored to the original timing of the transmission side.

According to another embodiment of the present technology, there is provided a stream transmission and reception system including a transmission device, and a reception device. The transmission device includes a stream input unit configured to input a plurality of streams each constituted of continuous packets, a stream synthesizing unit configured to synthesize the plurality of input streams to obtain one stream, and a stream transmission unit configured to transmit the one obtained stream to the reception device. The stream synthesizing unit encodes at least a typical pattern portion of each packet of the plurality of streams using keys that are intrinsic to the respective streams for separation of packets of each stream on a reception side, and thereafter performs time-division multiplexing on the packets of the plurality of streams to obtain the one stream. The reception device includes a stream reception unit configured to receive the one stream from the transmission device, a stream separation unit configured to separate the one received stream to obtain the plurality of streams, and a stream output unit configured to output the plurality of obtained streams. The stream separation unit decodes an encoded portion of each packet of the one stream using the keys that are intrinsic to the plurality of respective streams, and thereafter discards a packet whose typical pattern portion has not been correctly decoded, thereby obtaining the plurality of streams.

According to another embodiment of the present technology, there is provided an electronic apparatus including a transmission device, and a reception device. The transmission device includes a stream input unit configured to input a plurality of streams each constituted of continuous packets, a stream synthesizing unit configured to synthesize the plurality of input streams to obtain one stream, and a stream transmission unit configured to transmit the one obtained stream to an external device. The stream synthesizing unit encodes at least a typical pattern portion of each packet of the plurality of streams using keys that are intrinsic to the respective streams for separation of packets of each stream on a reception side, and thereafter performs time-division multiplexing on the packets of the plurality of streams to obtain the one stream. The reception device includes a stream reception unit configured to receive the one stream that is obtained by performing time-division multiplexing on the packets of the plurality of streams from the external device, a stream separation unit configured to separate the one received stream to obtain the plurality of streams, and a stream output unit configured to output the plurality of obtained streams. At least a typical pattern portion of each packet of the plurality of streams constituting the one stream is encoded using the keys that are intrinsic to the respective streams. The stream separation unit decodes an encoded portion of each packet of the one stream using the keys that are intrinsic to the plurality of respective streams, and thereafter discards a packet whose typical pattern portion has not been correctly decoded, thereby obtaining the plurality of streams.

Note that, according to the embodiment of the present technology, for example, a storage that records at least one of the plurality of streams output from the stream output unit of the reception device may be further provided. In addition, according to the embodiment of the present technology, for example, a processing device that performs a descrambling process on the plurality of streams output from the stream output unit of the reception device and supplies the plurality of processed streams to the stream input unit of the transmission device may be further provided.

Advantageous Effects of Invention

According to an embodiment of the present technology, when a plurality of streams are synthesized and then transmitted as one stream, a reception side can simply and reliably acquire the plurality of original streams.

BRIEF DESCRIPTION OF DRAWINGS

Other objectives, characteristics, and advantageous effects of the technology disposed in the present specification will be clarified by more detailed description based on an embodiment to be described below and accompanying drawings.

FIG. 4 is a flowchart for describing a control process by a controller of the header addition unit for one TS packet.

FIG. 5 is a block part illustrating a configuration example of encoding units constituting the transmission processing unit and decoding units constituting a reception processing unit.

FIG. 6 is a diagram for describing each unit of the transmission processing unit.

DESCRIPTION OF EMBODIMENT

Figure 1:
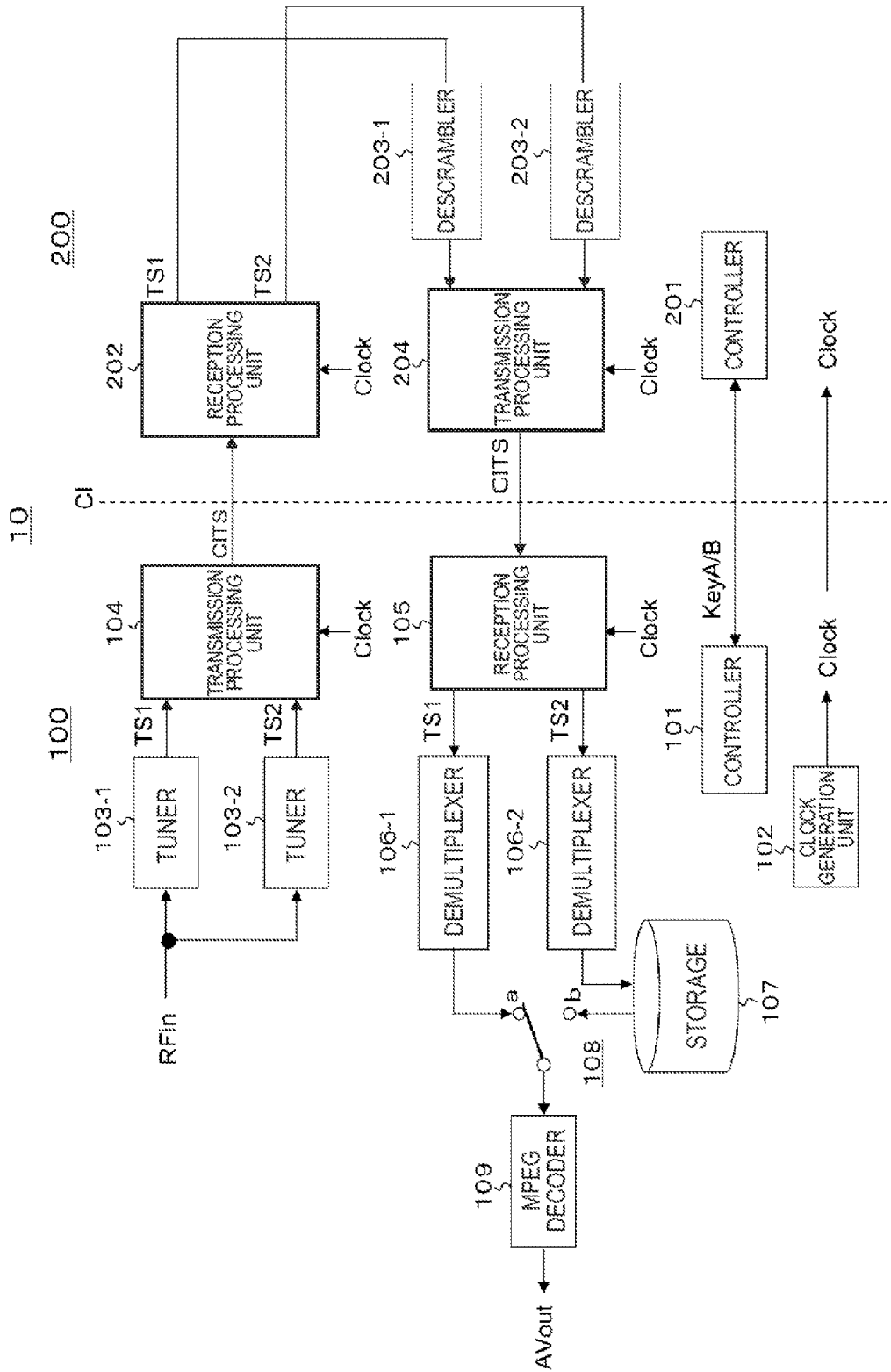
FIG. 1 is a block diagram illustrating a configuration example of a digital broadcasting reception system as an embodiment of the present technology.

Hereinafter, preferred embodiments (hereinafter referred to as embodiments) of the present disclosure will be described. Note that description will be provided in the following order.
1. Embodiment
2. Modified example 1. Embodiment Configuration Example of a Digital Broadcasting Reception System FIG. 1 illustrates a configuration example of a reception system 10 of digital broadcasting as an embodiment of the present technology. The reception system 10 is constituted of a host device 100 and a CAM module 200. The host device 100 is a television receiver set (TV set), a set-top box, or the like; however, the present embodiment exemplifies a PVR (Personal Video Recorder). The host device 100 and the CAM module 200 are connected to each other via a common interface (CI).

The host device 100 has a controller 101, a clock generation unit 102, tuners 103-1 and 103-2, and a transmission processing unit 104. In addition, the host device 100 has a reception processing unit 105, demultiplexers 106-1 and 106-2, a storage 107, a changeover switch 108, and an MPEG decoder 109.

The controller 101 has a microprocessor, and controls operations of each of the units of the host device 100. The clock generation unit 102 generates a high-speed clock Clock. For example, the transmission processing unit 104, the reception processing unit 105, and the like perform processes in synchronization with the clock Clock. Note that the clock Clock is also supplied to the CAM module 200 via the common interface (CI). A reception processing unit, a transmission processing unit, and the like of the CAM module 200 also perform processes in synchronization with the clock Clock.

Figure 13:
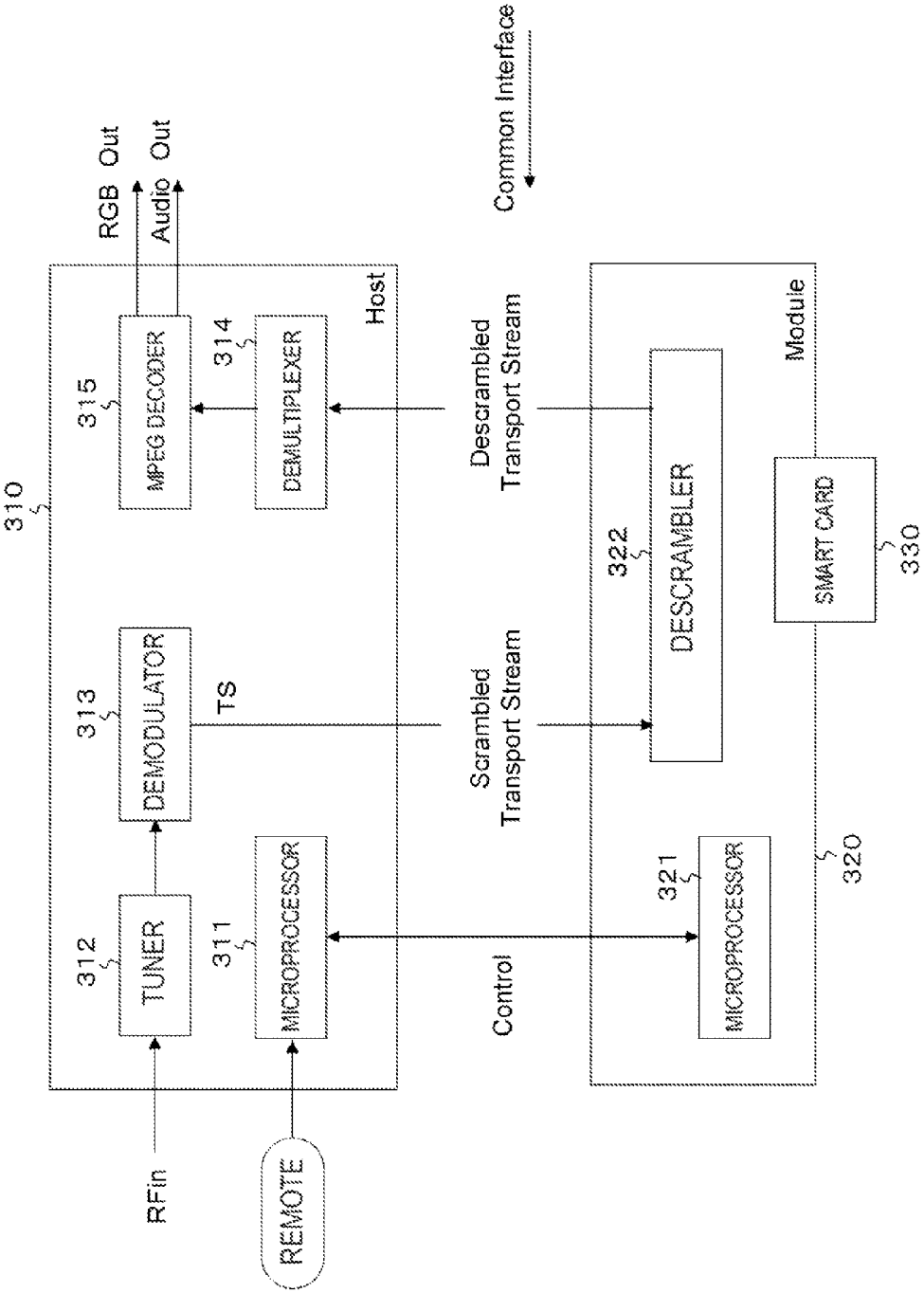
FIG. 13 is a block diagram illustrating a configuration example of a digital digital broadcasting reception system based on a set of standards (EN 50221) that uses conditional access.
Figure 14:
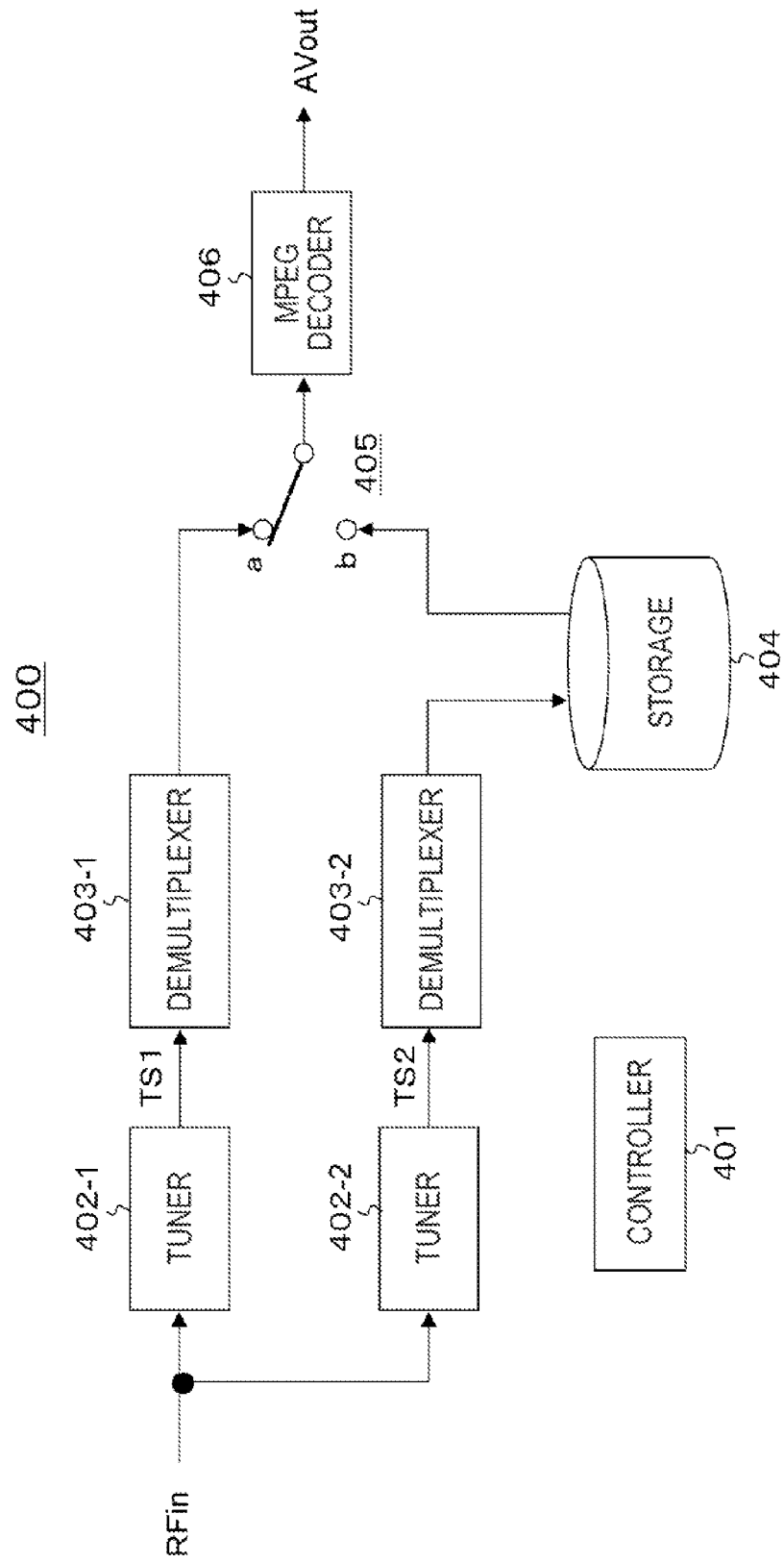
FIG. 14 is a block diagram illustrating a configuration example of a PVR with which taping and viewing can be performed at the same time.
Figure 15:
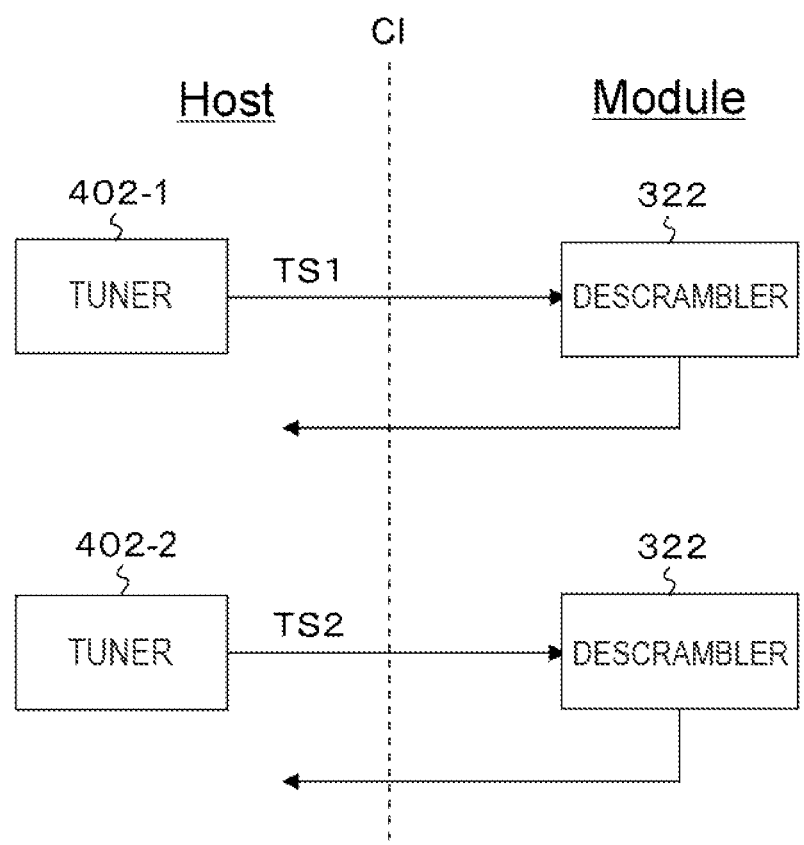
FIG. 15 is a diagram illustrating a principle that enables one CAM module to descramble two transport streams TS1 and TS2 at the same time.

The tuners 103-1 and 103-2 respectively receive RF modulated signals of transport streams TS1 and TS2 of different channels transmitted from a broadcasting station. The tuners 103-1 and 103-2 respectively down-convert the RF modulated signals so as to have an intermediate frequency (IF), then demodulate the IF modulated signals, and thereby obtain the transport streams TS1 and TS2 of a baseband. Here, the tuners 103-1 and 103-2 correspond respectively to the tuner 312 and the demodulator 313 of the host device 310 of FIG. 13. Note that the tuners 103-1 and 103-2 constitute a stream input unit.

The transmission processing unit 104 synthesizes the two input transport streams TS1 and TS2, thereby obtaining one stream CITS. In other words, the transmission processing unit 104 encodes TS (Transport Stream) packets of the transport streams TS1 and TS2 using keys intrinsic to the respective streams. Then, the transmission processing unit 104 performs multiplexing, in other words, time-division multiplexing on the TS packets of the two streams TS1 and TS2 thereafter, and obtains one stream CITS to be transmitted to the CAM module 200 via the common interface (CI).

The transmission processing unit 104 performs the encoding in order to separate the one stream CITS into the TS packets of the respective transport streams TS1 and TS2 on the reception side. Note that it is not necessary to encode the entire TS packets, and it is sufficient to encode at least a typical pattern portion, for example, a sync word (0x47) portion in the head of each packet. The transmission processing unit 104 configures a stream synthesizing unit.

Figure 2:
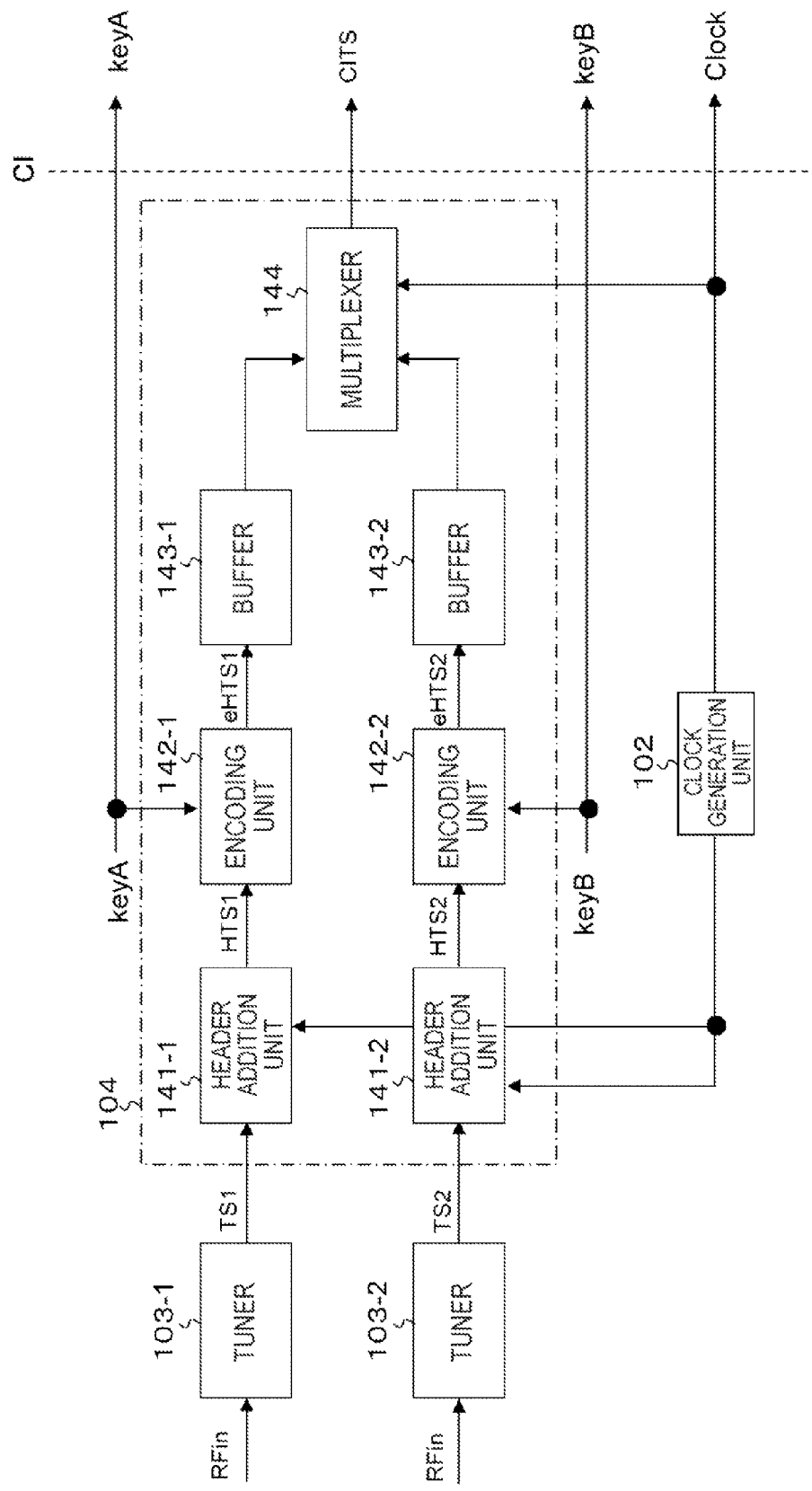
FIG. 2 is a block diagram illustrating a configuration example of a transmission processing unit constituting the digital broadcasting reception system.

FIG. 2 illustrates a configuration example of the transmission processing unit 104. The transmission processing unit 104 has header addition units 141-1 and 141-2, encoding units 142-1 and 142-2, buffers 143-1 and 143-2, and a multiplexer 144.

The header addition units 141-1 and 141-2 respectively add headers having a predetermined length to the heads of the TS packets of the transport streams TS1 and TS2 in synchronization with the high-speed clock Clock, thereby obtaining transport streams HTS1 and HTS2. In the present embodiment, each header is designed to include a 1-byte sync byte (SB) in a typical pattern and a 3-byte time stamp (TS) in this order.

Figure 3:
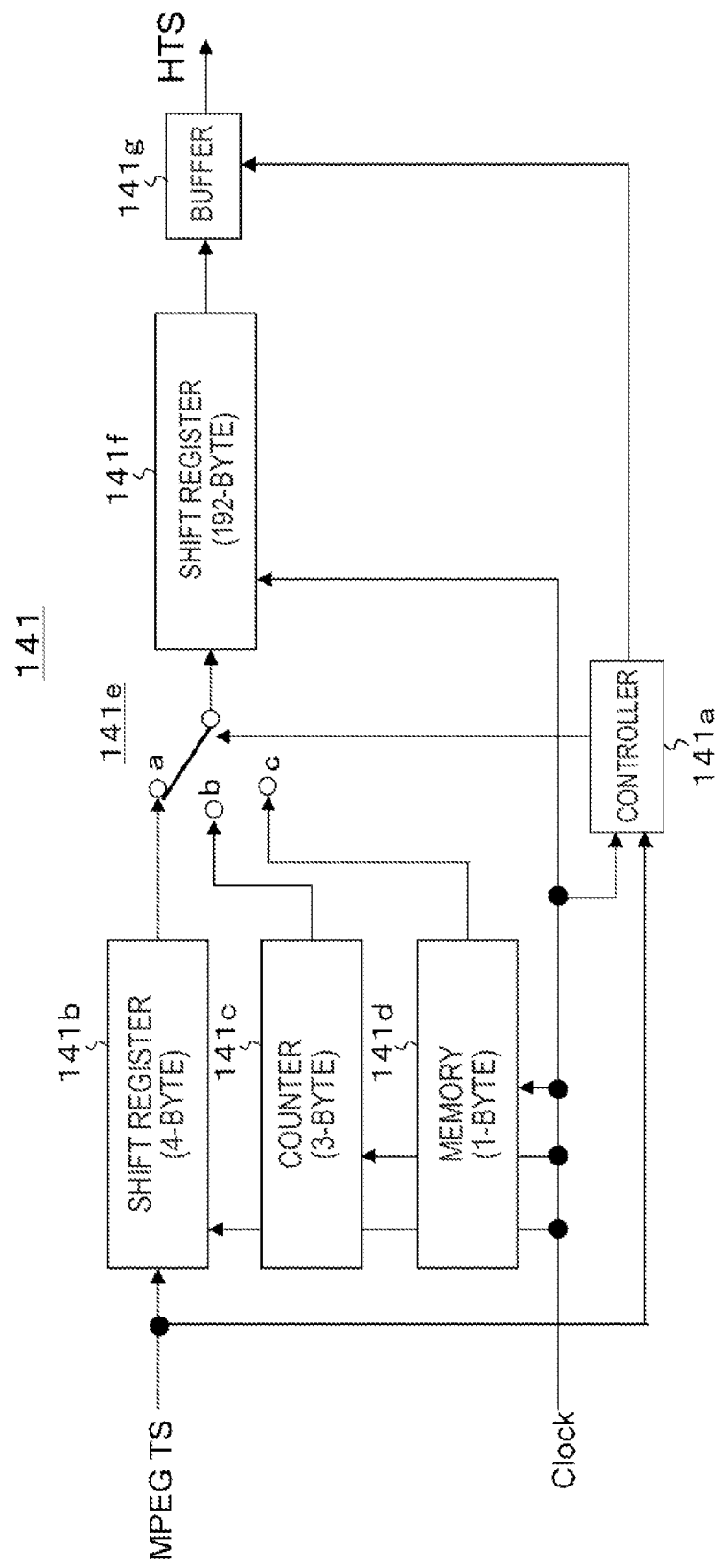
FIG. 3 is a block diagram illustrating a configuration example of a header addition unit constituting the transmission processing unit.

FIG. 3 illustrates a configuration example of the header addition unit 141 (141-1 or 141-2). The header addition unit 141 has a controller 141a, a 4-byte shift register 141b, a 3-byte counter 141c, a 1-byte memory 141d, a changeover switch 141e, a 192-byte shift register 141f, and a buffer 141g.

The controller 141a includes a microprocessor, and controls operations of the units of the header addition unit 141. The controller 141a may be present independently, or may be replaced by the controller 101 described above.

The shift register 141b receives sequential inputs of TS packets of transport streams TS (TS1 and TS2), performs a shifting process in synchronization with the high-speed clock Clock, and then outputs the data. The counter 141c counts a clock Clock, thereby generating 3-byte time information. The memory 141d stores 1-byte typical pattern data (fixed data) for the sync byte (SB).

The changeover switch 141e repeats sequential connection to fixed terminals on the c side, b side, and a side in units of a 192-byte period based on the clock Clock according to control of the controller 141a. In other words, the changeover switch is connected to the fixed terminal on the c side in a first 1-byte period of the 192-byte period. Successively, the changeover switch is connected to the fixed terminal on the b side in a 3-byte period. Further, the changeover switch is connected to the fixed terminal on the side in a 188-byte period.

In the 1-byte period in which the changeover switch 141e is connected to the c side, the 1-byte typical pattern data is read from the memory 141d and supplied to the fixed terminal on the c side of the changeover switch 141e according to control of the controller 141a. For this reason, in the 1-byte period, the changeover switch 141e outputs a 1-byte sync byte (SB).

In addition, in the 3-byte period in which the changeover switch 141e is connected to the b side, a 3-byte count value latched at a first timing of the period is output from the counter 141c, and supplied to the fixed terminal on the b side of the changeover switch 141e according to control of the controller 141a. For this reason, in the 3-byte period, the changeover switch 141e outputs a 3-byte time stamp (TS).

In addition, in the 188-byte period in which the changeover switch 141e is connected to the a side, a 188-byte TS packet portion is output from the shift register 141b and supplied to the fixed terminal on the a side of the changeover switch 141e according to control of the controller 141a. For this reason, in the 188-byte period, the changeover switch 141e outputs the 188-byte TS packet portion.

The shift register 141f stores the 1-byte sync byte (SB), the 3-byte time stamp (TS), and the 188-byte TS packet portion which are output from the changeover switch 141e in units of 192-byte periods based on the clock Clock. In other words, the shift register 141f stores TS packets to which headers are added in units of 192-byte periods, and successively repeats outputting of the packets in a 192-byte period.

The buffer 141g sequentially buffers the TS packets to which the headers are added and which are sequentially output from the shift register 141f, in other words, each packet of the transport stream HTS, and outputs them at an appropriate timing based on control of the controller 141a.

The flowchart of FIG. 4 illustrates a control process performed on one TS packet by the controller 141a in the above-described header addition unit 141. The controller 141a starts the process in Step ST1. Then, the controller 141a detects the sync word (0x47) in the head of the 188-byte TS packet of the transport stream TS (MPEG TS), and then recognizes the head of the TS packet in Step ST2.

Next, in Step ST3, the controller 141a reads the 1-byte typical pattern data, i.e., the sync byte (SB) from the memory 141d, and inputs the data to the shift register 141f on the c side of the changeover switch 141e. Next, in Step ST4, the controller 141a causes the counter 141c to output a 3-byte count value indicating time information, and inputs the information to the shift register 141f on the b side of the changeover switch 141e.

Next, in Step ST5, in Step ST5, the 188-byte TS packet portion is sequentially output from the shift register 141b, and input to the shift register 141f on the a side of the changeover switch 141e. Next, in Step ST6, the content of the shift register 141f is output through the buffer 141g as a TS packet of the transport stream HTS. Then, the controller 141a ends the process in Step ST7.

Returning to FIG. 2, the encoding units 142-1 and 142-2 respectively encode the TS packet portion of the transport streams HTS1 and HTS2 using keys KeyA and KeyB which are intrinsic to the streams, thereby obtaining transport streams eHTS1 and eHTS2. As described above, it is sufficient only to encode a typical pattern portion, for example, the sync word (0x47) portion of the head, but here, it is assumed that the entire TS packets are encoded.

FIG. 5 illustrates a configuration example of the encoding units 142 (142-2 and 142-2). Each of the encoding units 142 has a memory 142a and an exclusive-OR part (EX-OR part) 142b. The memory 142a stores 188-byte-long keys (KeyA and KeyB). The exclusive-OR part (EX-OR part) 142b encodes the 188-byte TS packet portion of the input transport stream HTS by taking the exclusive OR of the 188-byte-long keys (KeyA and KeyB) for each bit. Note that decoding units to be described later have the same configuration as the encoding units 142 (142-2 and 142-2). In FIG. 4, "CITS" on the input side and "H' TS" on the output side indicate input and output of the decoding units.

(a) of FIG. 6 shows the transport streams TS1 and TS2, each showing continuous TS packets. Note that each TS packet has a packet length of 188 bytes, and includes a sync word (0x47) in the head, a PID (packet identifier), a payload (Payload), and the like. (b) of FIG. 6 shows the transport stream eHTS1 which is obtained from the encoding unit 142-1 by encoding the entire TS packets using the key KeyA, to which headers are added. (c) of FIG. 6 shows the transport stream eHTS2 which is obtained from the encoding unit 142-1 by encoding the entire TS packets using the key KeyB, to which headers are added.

Returning to FIG. 2, the buffers 143-1 and 143-2 temporarily accumulate the transport streams eHTS1 and eHTS2 respectively and then buffer the streams. The multiplexer 144 alternately takes out packets of the transport streams eHTS1 and eHTS2 from the buffers 143-1 and 143-2 in synchronization with the high-speed clock Clock to perform time-division multiplexing, thereby obtaining one stream CITS. (d) of FIG. 6 shows the stream CITS.

An operation of the transmission processing unit 104 illustrated in FIG. 2 will be briefly described. The transport streams TS1 and TS2 (refer to (a) of FIG. 6) output from the tuners 103-1 and 103-2 are supplied respectively to the header addition units 141-1 and 141-2. The header addition units 141-1 and 141-2 add headers each including the sync bite (SB) and the time stamp (TS) respectively to the heads of the TS packets of the transport streams TS1 and TS2 in synchronization with the clock Clock.

The transport streams HTS1 and HTS2 which are obtained by the header addition units 141-1 and 141-2 by adding the headers thereto are respectively supplied to the encoding units 142-1 and 142-2. The encoding units 142-1 and 142-2 respectively encode the TS packets of the transport streams HTS1 and HTS2 using the keys KeyA and KeyB which are intrinsic to the streams, and thereby the transport streams eHTS1 and eHTS2 are obtained (refer to (b) and (c) of FIG. 6).

The transport streams eHTS1 and eHTS2 which have the headers added and are obtained by the encoding units 142-1 and 142-2 by encoding the 188-byte TS packet portions are respectively accumulated in the buffers 143-1 and 143-2 temporarily, and then buffered. Then, the multiplexer 144 alternately takes out the packets of the transport streams eHTS1 and eHTS2 from the buffers 143-1 and 143-2 in synchronization with the clock Clock, thereby obtaining one transport stream CITS (refer to (d) of FIG. 6).

Figure 7:
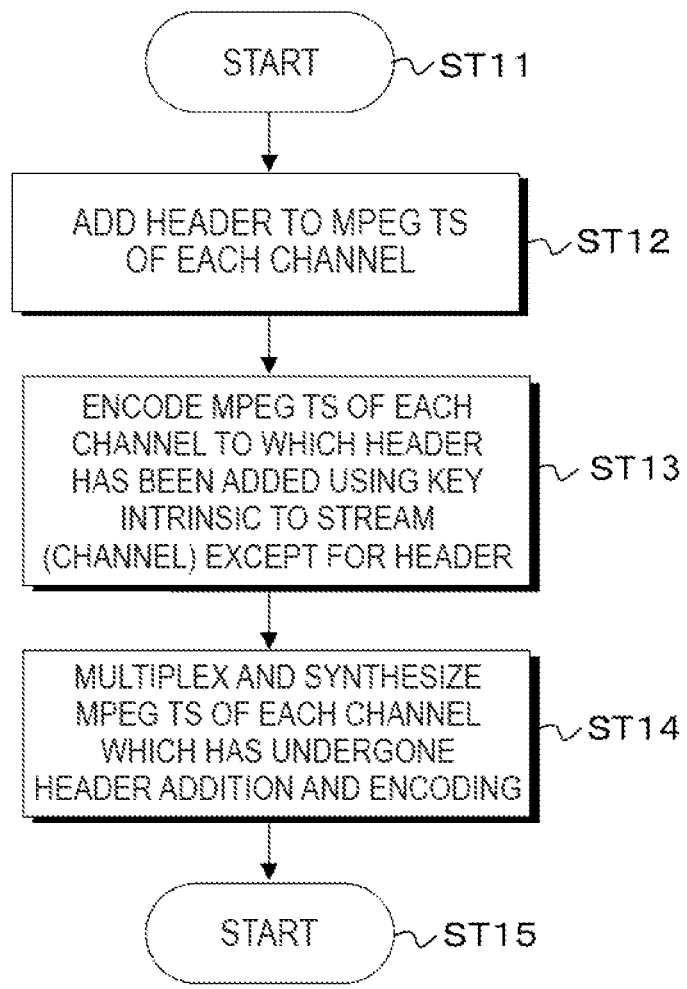
FIG. 7 is a flowchart for describing a conceptual flow of a process performed by the transmission processing unit.

The flowchart of FIG. 7 shows a conceptual flow of a process performed by the transmission processing unit 104. In Step ST11, the transmission processing unit 104 starts the process. Next, in Step ST12, the headers each constituted of a 1-byte sync byte (SB) and 3-byte time stamp (TS) are respectively added to the TS packets of the transport streams TS1 and TS2 of each channel.

Next, in Step ST13, the transmission processing unit 104 encodes the TS packets of the respective transport streams HTS1 and HTS2 to which the headers have been added using the keys KeyA and KeyB which are intrinsic to the streams (channels) except for the headers. Next, in Step ST14, the TS packets of the transport streams eHTS1 and eHTS2 which have undergone the header addition and encoding are multiplexed in a time-dividing manner using multiplexing and then synthesized, and thereby one transport stream CITS is obtained. Then the transmission processing unit 104 ends the process in Step ST15.

Returning to FIG. 1, the reception processing unit 105 obtains the two transport streams TS1 and TS2 by separating the one stream (synthesized stream) CITS that is transmitted from the CAM module 200 via the common interface. In other words, the reception processing unit 105 obtains the two streams by performing a decoding process on the stream CITS using the keys KeyA and KeyB which are intrinsic to the respective streams described above.

In this case, the encoded portion of each TS packet of the stream CITS is decoded, only the encoded portion of each TS packet of each stream which has been encoded using the same key is correctly decoded, and the typical pattern portion is also correctly decoded. The reception processing unit 105 discards a packet of which the typical pattern portion has not been correctly decoded in the two streams that have undergone the decoding process, thereby obtaining the two final transport streams TS1 and TS2. The reception processing unit 105 configures a stream separation unit.

Figure 8:
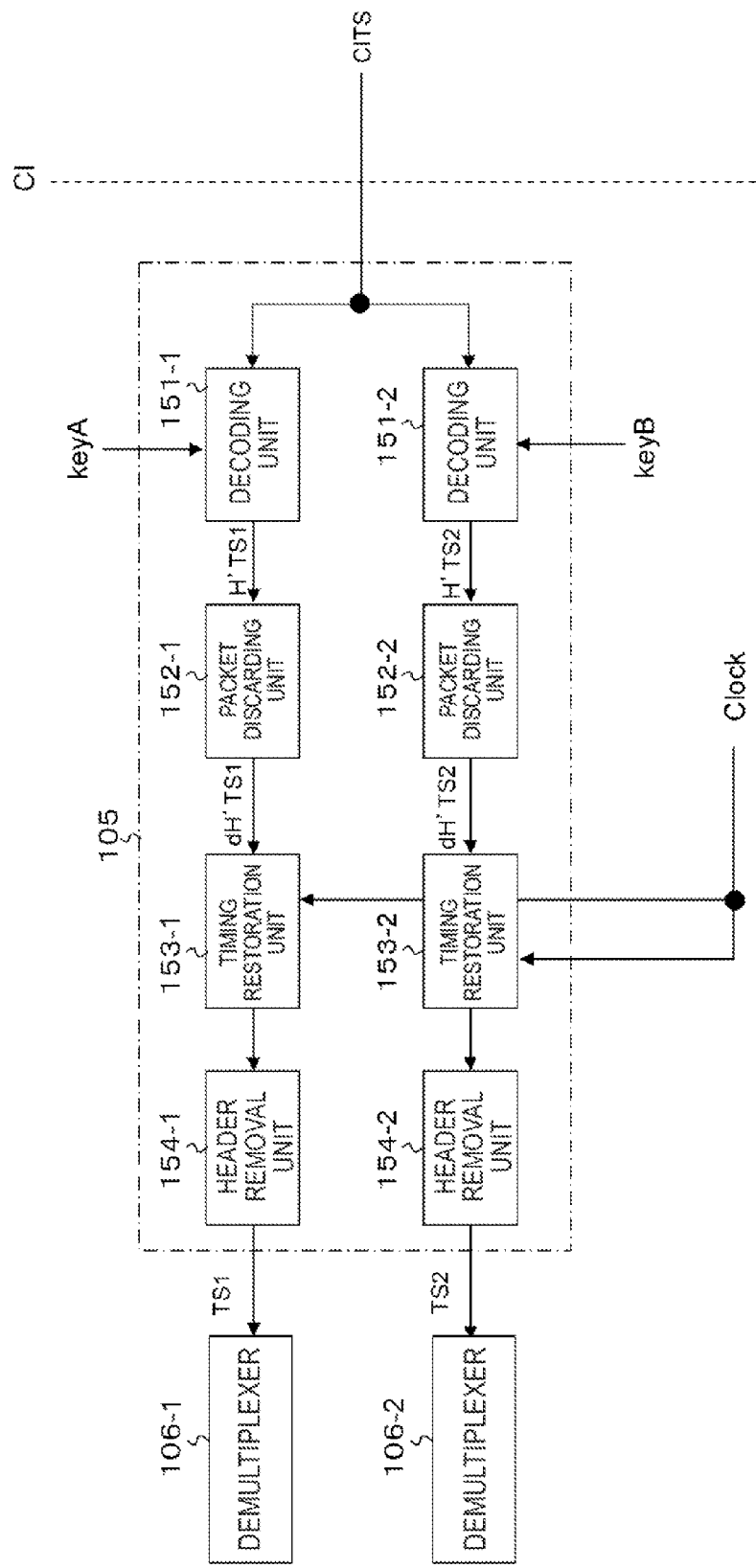
FIG. 8 is a block diagram illustrating a configuration example of a reception processing unit constituting the digital broadcasting reception system.

FIG. 8 illustrates a configuration example of the reception processing unit 105. The reception processing unit 105 has decoding units 151-1 and 151-2, packet discarding units 152-1 and 152-2, timing restoration units 153-1 and 153-2, and header removal units 154-1 and 154-2.

The decoding units 151-1 and 151-2 respectively perform decoding processes on the stream CITS, and obtain transport streams H'TS1 and H'TS2. Here, the decoding units 151-1 and 151-2 decode the encoded portion of each TS packet of the stream CITS using the keys KeyA and KeyB which are intrinsic to the streams. Details of the decoding units 151-1 and 151-2 are not described since the decoding units are configured in the same manner as the encoding units 142-2 and 142-2 described above as illustrated in FIG. 5.

Figure 9:
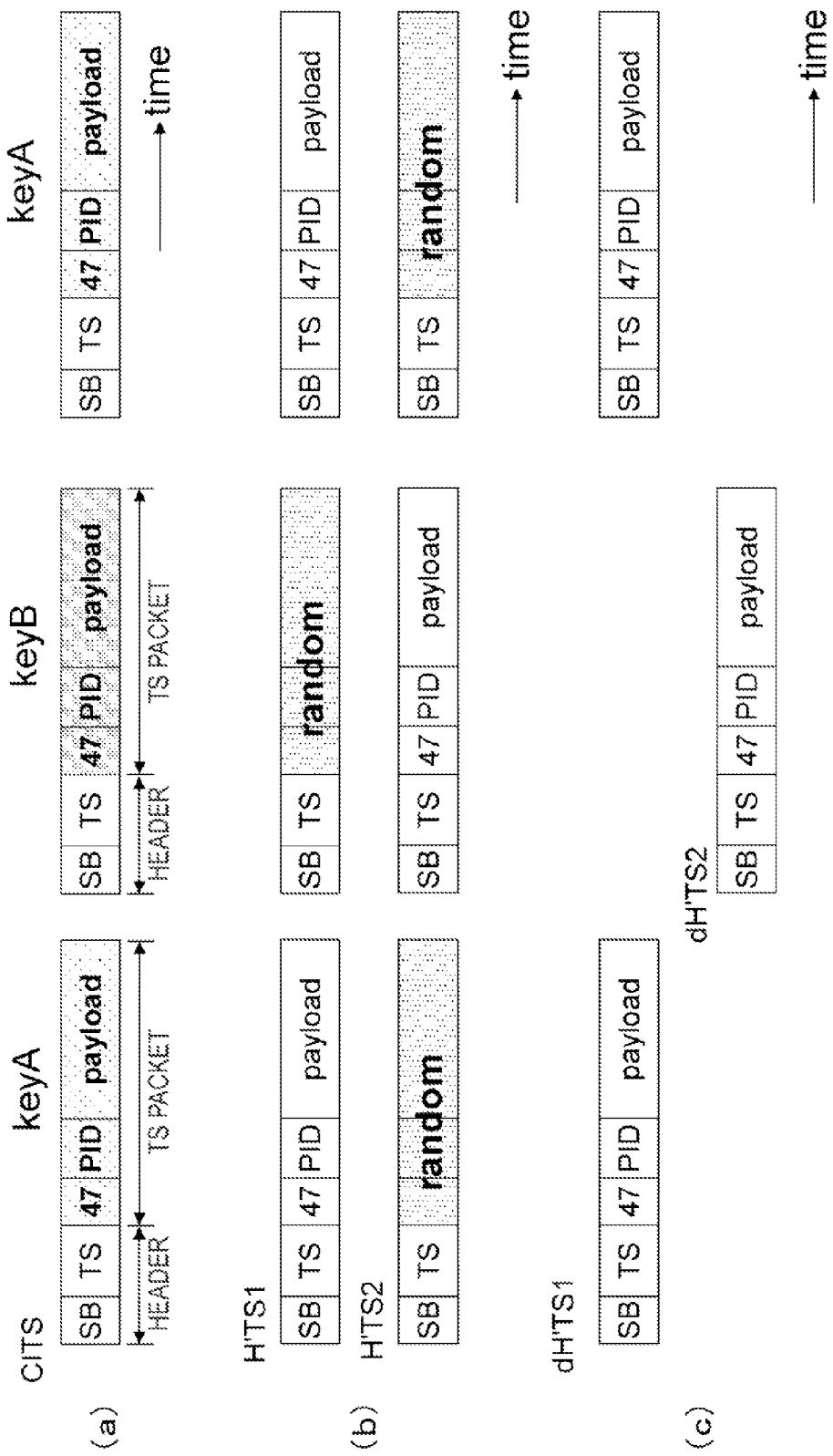
FIG. 9 is a diagram for describing each unit of the reception processing unit.

In this case, only the encoded portion of each TS packet of the transport streams H'TS1 and H'TS2 which has been encoded using the same key is correctly decoded, and the typical pattern portion is also correctly decoded. (a) of FIG. 9 shows the stream CITS. In addition, (b) of FIG. 9 shows the transport streams H'TS1 and H'TS2. In the drawing, the portion of "random" indicates a portion which is not correctly decoded.

The packet discarding units 152-1 and 152-2 respectively discard a packet of which the typical pattern portion such as the sync word (0x47) portion has not been correctly decoded from each TS packet of the transport streams H'TS1 and H'TS2, thereby obtaining transport streams dH'TS1 and dH'TS2. (c) of FIG. 9 shows the transport streams dH'TS1 and dH'TS2.

The timing restoration units 153-1 and 153-2 respectively restore a timing of each of TS packets of the transport streams H'TS1 and H' TS2 based on time stamps (TSs) of headers added to the packets. The header removal units 154-1 and 154-2 respectively remove the header added to each of the TS packets of which the timing of the transport streams dH'TS1 and dH'TS2 has been restored, thereby obtaining the final transport streams TS1 and TS2.

Figure 10:
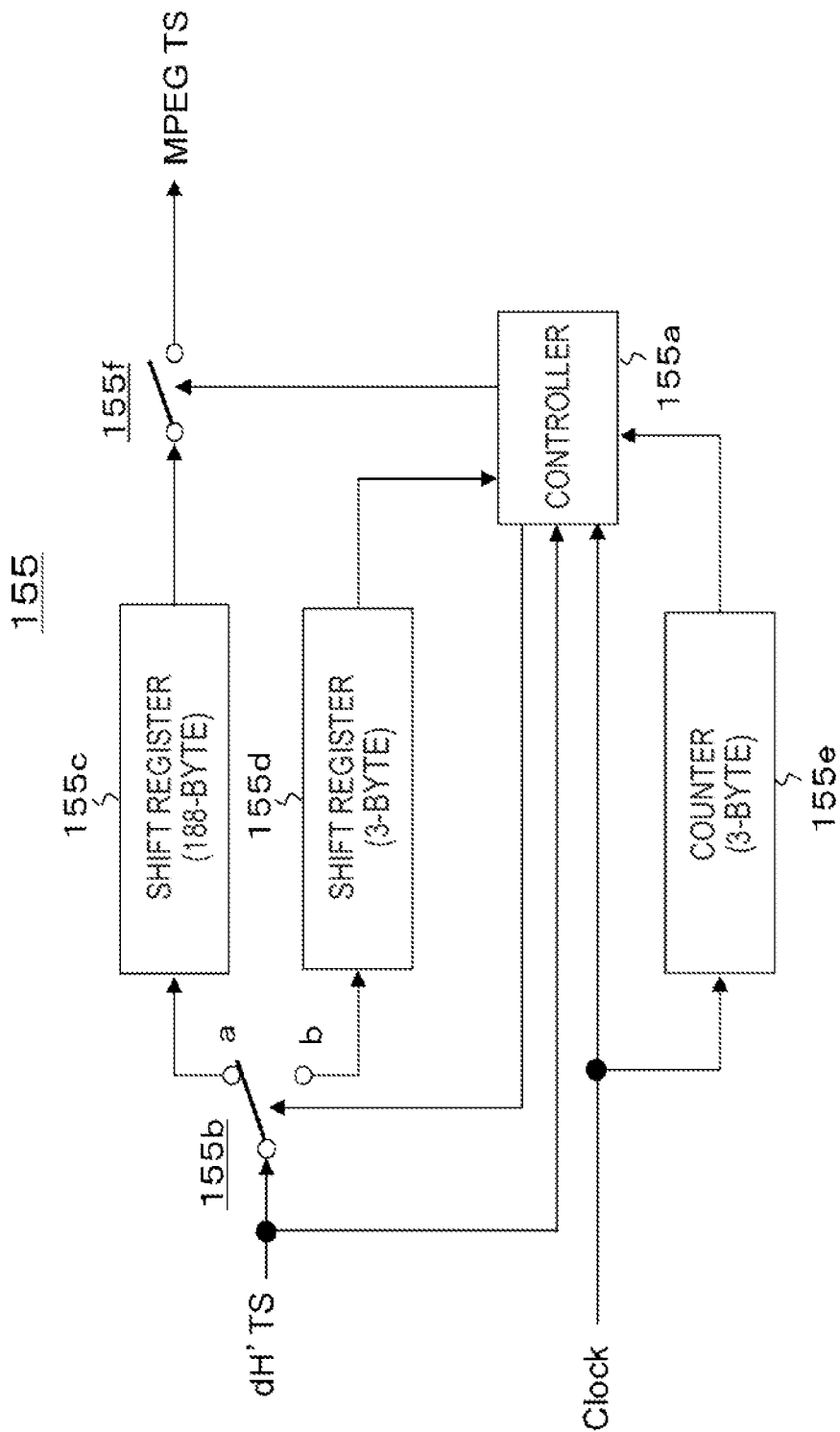
FIG. 10 is a block diagram illustrating a configuration example of a processing unit that includes timing restoration units and header removal units constituting the reception processing unit.

FIG. 10 illustrates a configuration example of a processing unit 155 including the timing restoration units 153 (153-1 and 153-2) and the header removal units 154 (154-1 and 154-2). The processing unit 155 has a controller 155a, a changeover switch 155b, a 188-byte shift register 155c, a 3-byte shift register 155d, a 3-byte counter 155e, and a connection switch 155f.

The controller 155a has a microprocessor, and controls operations of each of the units of the processing unit 155. The controller 155a may be present independently, or may be replaced by the controller 101 described above.

The changeover switch 155b selectively supplies a predetermined portion of each TS packet of the transport stream dH'TS to which a header is added to the shift register 155c and a shift register 155d according to control of the controller 155a.

In other words, the controller 155a controls such that the changeover switch 155b is connected to a b side in a 3-byte period after a sync byte (SB) of the header of each TS packet of the transport stream dH'TS. Accordingly, a 3-byte time stamp (TS) of the header of each TS packet is input to the shift register 155d.

In addition, the controller 155a thereafter controls such that the changeover switch 155b is connected to a side in a 188-byte period. Accordingly, a 188-byte TS packet of which the header has been removed is input to the shift register 155c.

The shift register 155c receives and stores the input of the 188-byte TS packet supplied from the side of the changeover switch 155b. In addition, the shift register 155d receives and stores the 3-byte time stamp (TS) supplied from the b side of the changeover switch 155b. The counter 155e counts the clock Clock, and then generates 3-byte time information.

The connection switch 155f is in a connection state in a period of each packet of the transport stream TS according to control of the controller 155a. In other words, the controller 155a controls such that the connection switch 155f is in a connection state when a count value of the counter 155e matches a time stamp (TS) stored in the shift register 155d. Then the controller 155a reads the 188-byte TS packet stored in the shift register 155c, and outputs the packet through the connection switch 155f.

Figure 11:
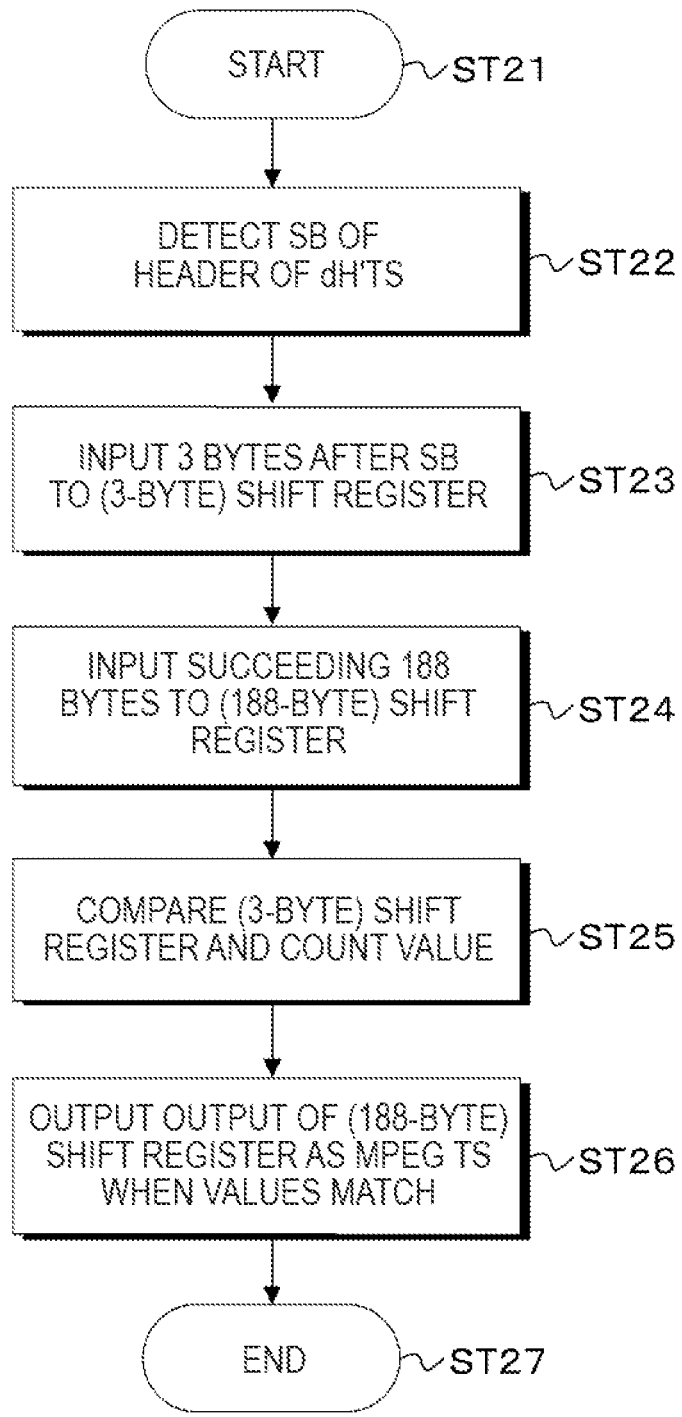
FIG. 11 is a flowchart for describing a control process by a controller of the processing unit (including the timing restoration unit and the header removal unit) for one TS packet.

The flowchart of FIG. 11 shows a control process of the controller 155a in the processing unit 155 described above for one TS packet. The controller 155a starts the process in Step ST21. Then, in Step ST22, the controller 155a detects a sync byte (SB) in the head of the header added to a TS packet of the transport stream dH'TS, thereby recognizing the head of the header.

Next, in Step ST23, the controller 155a causes the changeover switch 155b to be connected to the b side in a 3-byte period after the detection of the sync byte (SB), and then inputs a 3-byte time stamp (TS) included in the header to the shift register 155d to be stored therein. Next, in Step ST24, the controller 155a causes the changeover switch 155b to be connected to the a side in a 188-byte period thereafter, and then inputs a 188-byte TS packet to the shift register 155c to be stored therein.

Next, in Step ST25, the controller 155a compares the value stored in the shift register 155d, i.e. the type stamp (TS) to a value of the counter 155e (count value). When the values match, the controller 155a then causes the connection switch 155f to be in a connection state and outputs the 188-byte TS packet stored in the shift register 155c as a TS packet of a transport stream TS (MPEG TS) in Step ST26. Then, the controller 155a ends the process in Step ST27.

An operation of the reception processing unit 105 illustrated in FIG. 8 will be briefly described. One stream CITS (refer to (a) of FIG. 9) supplied from the CAM module 200 is supplied to the decoding units 151-1 and 151-2. The decoding units 151-1 and 151-2 respectively decode an encoded portion of each TS packet of the stream CITS using the keys KeyA and KeyB which are intrinsic to the streams, thereby obtaining the transport streams H'TS1 and H'TS2 (refer to (b) of FIG. 9).

The transport streams H'TS1 and H'TS2 decoded by the decoding units 151-1 and 151-2 are respectively supplied to the packet discarding units 152-1 and 152-2. The packet discarding units 152-1 and 152-2 respectively discard a packet of which the typical pattern portion such as the sync word (0x47) has not been correctly decoded from each TS packet of the transport streams H'TS1 and H'TS2. From the packet discarding, the transport streams dH'TS1 and dH'TS2 (refer to (c) of FIG. 9) are obtained.

The transport streams dH'TS1 and dH'TS2 obtained by the packet discarding units 152-1 and 152-2 are respectively supplied to the timing restoration units 153-1 and 153-2. The timing restoration units 153-1 and 153-2 respectively restore a timing of each TS packet of the transport streams H'TS1 and H'TS2 based on a time stamp (TS) of the header added to the packet.

The transport streams dH'TS1 and dH'TS2 that have undergone the timing restoration process in the timing restoration units 153-1 and 153-2 are respectively supplied to the header removal units 154-1 and 154-2. The header removal units 154-1 and 154-2 respectively remove the header added to each TS packet of the transport streams dH'TS1 and dH'TS2, thereby obtaining the final transport streams TS1 and TS2.

Figure 12:
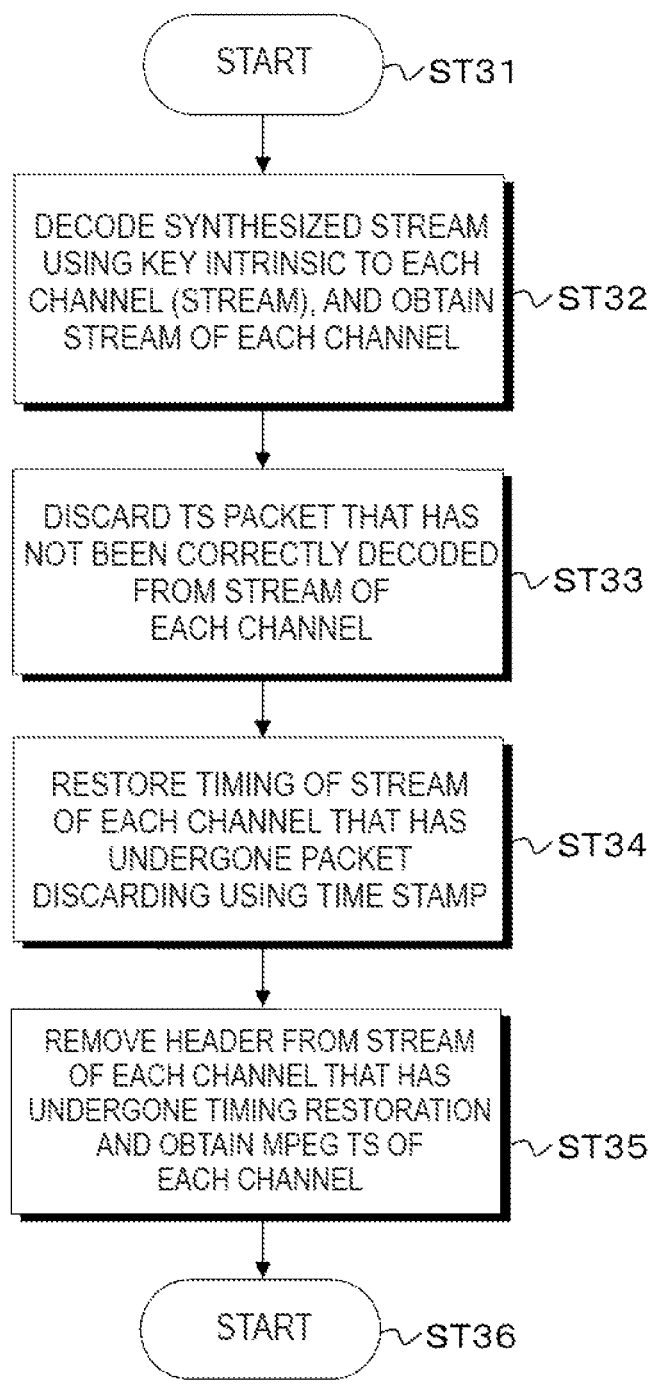
FIG. 12 is a flowchart for describing a conceptual flow of a process performed by the reception processing unit.

The flowchart of FIG. 12 shows a conceptual flow of the process performed by the reception processing unit 105. The reception processing unit 105 starts the process in Step ST31. Next, in Step ST32, the reception processing unit 105 performs a decoding process on the stream CITS using the keys KeyA and KeyB which are intrinsic to the streams (channels), thereby obtaining the transport streams H'TS1 and H' TS2.

Next, in Step ST33, the reception processing unit 105 discards a TS packet which has not been correctly decoded from the transport streams H'TS1 and H'TS2 of each channel. Next, in Step ST34, the reception processing unit 105 restores a timing of the transport streams dH'TS1 and dH'TS2 that have undergone the packet discarding to a timing before synthesis using a time stamp (TS) included in a header.

Next, in Step ST35, the reception processing unit 105 removes the header from the transport streams dH'TS1 and dH'TS2 that have undergone the timing restoration, thereby obtaining the transport streams TS1 and TS2. Then, the reception processing unit 105 ends the process in Step ST36.

Returning to FIG. 1, the demultiplexers 106-1 and 106-2 respectively extract video and audio PID data packets of a selected (tuned) service channel from the transport streams TS1 and TS2 obtained by the reception processing unit 105. The storage 107 records and reproduces the video and audio PID data packets extracted by the demultiplexer 106-2.

The changeover switch 108 selectively outputs the video and audio PID data packets extracted by the demultiplexer 106-1 or the video and audio PID data packets reproduced by the storage 107. In other words, the changeover switch 108 is connected to the a side during a taping and viewing time in which taping and viewing are performed at the same time, and connected to the b side during reproduction according to control of the controller 101.

The MPEG decoder 109 decodes each elementary stream constituted of the video and audio PID data packets output from the changeover switch 108, thereby obtaining video data and audio data.

The CAM module 200 has a controller 201, a reception processing unit 202, descramblers 203-1 and 203-2, and a transmission processing unit 204. The controller 201 has a microprocessor, and controls operations of each of the units of the CAM module 200. The controller 201 acquires the keys KeyA and KeyB which are intrinsic to the streams described above when, for example, the host device 100 is connected to the CAM module 200, for example, according to communication between the controller 101 of the host device 100. Note that the high-speed clock Clock generated by the clock generation unit 102 of the host device 100 is supplied to and used by the CAM module 200.

The reception processing unit 202 separates the one stream (synthesized stream) CITS transmitted from the host device 100 so as to obtain the two transport streams TS1 and TS2. In other words, the reception processing unit 202 performs a decoding process on the stream CITS using the keys KeyA and KeyB which are intrinsic to the respective streams, thereby obtaining the two streams. Although detailed description is omitted, the reception processing unit 202 has the same configuration as the reception processing unit 105 of the host device 100 described above (refer to FIG. 8).

The descramblers 203-1 and 203-2 respectively perform descrambling processes on the transport streams TS1 and TS2 obtained by the reception processing unit 202. The transmission processing unit 204 synthesizes the transport streams TS1 and TS2 that have undergone the process in the descramblers 203-1 and 203-2, thereby obtaining the one stream CITS (synthesized stream) to be transmitted to the CAM module 200 via the common interface CI.

In other words, the transmission processing unit 204 encodes TS packets of the transport streams TS1 and TS2 using the keys KeyA and KeyB which are intrinsic to the respective streams. Then, the TS packets of each of the streams are multiplexed in a time-dividing manner, and then the one stream CITS is obtained. Although detailed description is omitted, the transmission processing unit 204 has the same configuration as the transmission processing unit 104 of the host device 100 described above (refer to FIG. 2).

An operation of the digital broadcasting reception system 10 illustrated in FIG. 1 will be described. The tuners 103-1 and 103-2 of the host device 100 respectively receive RF modulated signals of the transport streams TS1 and TS2 of different channels transmitted from a broadcasting station. The tuners 103-1 and 103-2 respectively down-convert the RF modulated signals so as to have an intermediate frequency (IF), and then demodulate the IF modulated signals, thereby obtaining the transport streams TS1 and TS2 of a baseband.

The transport streams TS1 and TS2 obtained by the tuners 103-1 and 103-2 are supplied to the transmission processing unit 104. The transmission processing unit 104 synthesizes the two transport streams TS1 and TS2, thereby obtaining the one stream (synthesized stream) CITS. In other words, the transmission processing unit 104 encodes TS packets of the transport streams TS1 and TS2 using the keys KeyA and Key B which are intrinsic to the respective streams. In addition, the transmission processing unit 104 thereafter performs time-division multiplexing on the TS packets of the two streams TS1 and TS2, thereby obtaining the stream CITS. The stream CITS is transmitted to the CAM module 200 via the common interface CI.

The reception processing unit 202 of the CAM module 200 receives the one stream CITS transmitted from the host device 100. The reception processing unit 202 separates the stream CITS, thereby obtaining the two transport streams TS1 and TS2. In other words, the reception processing unit 202 performs a decoding process on the stream CITS using the keys KeyA and KeyB which are intrinsic to the respective streams, thereby obtaining the transport streams TS1 and TS2.

In this case, the encoded portion of each TS packet of the stream CITS is decoded, and only the encoded portion of each TS packet of each stream which has been encoded using the same key is correctly decoded, and the typical pattern portion is also correctly decoded. The reception processing unit 202 furthermore discards a packet of which the typical pattern portion has not been correctly decoded from the two streams that have undergone the decoding process, thereby obtaining the two final transport streams TS1 and TS2.

The two transport streams TS1 and TS2 obtained by the reception processing unit 202 are respectively supplied to the descramblers 203-1 and 203-2. The descramblers 203-1 and 203-2 respectively perform descrambling processes on the transport streams TS1 and TS2. Then, the transport streams TS1 and TS2 that have undergone the process are supplied to the transmission processing unit 204.

The transmission processing unit 204 obtains the one stream (synthesized stream) CITS that is obtained by synthesizing the two transport streams TS1 and TS2. In other words, the transmission processing unit 202 encodes the TS packets of the transport streams TS1 and TS2 using the keys KeyA and KeyB which are intrinsic to the respective streams. In addition, the transmission processing unit 204 thereafter performs time-division multiplexing on the two streams TS1 and TS2, thereby obtaining the stream CITS. The stream CITS is transmitted to the host device 100 via the common interface CI.

The reception processing unit 105 of the host device 100 receives the one stream CITS transmitted from the CAM module 200. The reception processing unit 105 separates the stream CITS, thereby obtaining the two transport streams ST1 and ST2. In other words, the reception processing unit 105 performs a decoding process on the stream CITS using the keys KeyA and KeyB which are intrinsic to the respective streams, thereby obtaining the transport streams TS1 and TS2.

In this case, an encoded portion of each TS packet of the stream CITS is decoded, and only an encoded portion of each TS packet of each stream which has been encoded using the same key is correctly decoded, and a typical pattern portion is also correctly decoded. The reception processing unit 105 furthermore discards a packet of which the typical pattern portion has not been correctly decoded from the two streams that have undergone the decoding process, thereby obtaining the two final transport streams TS1 and TS2. The transport streams TS1 and TS2 are respectively supplied to the demultiplexers 106-1 and 106-2.

The demultiplexers 106-1 and 106-2 respectively extract video and audio PID data packets of a selected (tuned) service channel from the transport streams TS1 and TS2. The video and audio PID data packets extracted by the demultiplexer 106-1 are input to the side of the changeover switch 108. On the other hand, the video and audio PID data packets extracted by the demultiplexer 106-2 are input to the storage 107. The video and audio PID data packets of the predetermined service channel reproduced from the storage 107 are input to the b side of the changeover switch 108.

During a taping and viewing time in which taping and viewing are performed at the same time, the video and audio PID data packets extracted by the demultiplexer 106-2 are recorded in the storage 107. In addition, in this case, the changeover switch 108 is connected to the side, and the video and audio PID data packets extracted by the demultiplexer 106-1 are selectively extracted. Then, the MPEG decoder 109 decodes each elementary stream constituted of the PID data packets, thereby obtaining video data and audio data.

In addition, during reproduction, the PID data packets of the predetermined service channel are reproduced from the storage 107. In addition, in this case, the changeover switch 108 is connected to the b side, and the video and audio PID data packets reproduced from the storage 107 are selectively extracted. Then, the MPEG decoder 109 decodes each elementary stream constituted of in the PID data packets, thereby obtaining video data and audio data.

As described above, in the digital broadcasting reception system 10 illustrated in FIG. 1, the transmission processing units 104 and 204 encode at least the typical pattern portions of the TS packets of the two transport streams TS1 and TS2 using the keys KeyA and KeyB which are intrinsic to the streams, thereby obtaining the one stream CITS. For this reason, the reception processing units 202 and 105 can simply and reliably acquire the original two transport streams TS1 and TS2 from the stream CITS.

In addition, in the digital broadcasting reception system 10 illustrated in FIG. 1, the transmission processing units 104 and 204 add a header that includes a sync byte (SB) respectively to each TS packet of the two transport streams TS1 and TS2. For this reason, even though a TS packet portion which has a sync word (0x47) in its head is encoded, the reception processing units 202 and 105 can satisfactorily detect and process each TS packet included in the stream CITS based on the sync byte (SB) of the added header.

In addition, in the digital broadcasting reception system 10 illustrated in FIG. 1, the transmission processing units 104 and 204 add a header that includes a time stamp (TS) respectively to each TS packet of the two transport streams TS1 and TS2. For this reason, in such a case, when the two transport streams TS1 and TS2 are to be obtained, the reception processing units 202 and 105 can restore a timing of each TS packet included in the transport streams to the original timing before synthesis.

2. Modified Example

Note that, in the embodiment described above, the host device 100 has the two tuners 103-1 and 103-2, thereby dealing with the two transport streams TS1 and TS2. The present technology can be applied in the same manner as above even when three or more transport streams are dealt with.

In addition, in the embodiment described above, the example in which the two transport streams TS1 and TS2 are transmitted from the host device 100 to the CAM module 200, or from the CAM module 200 to the host device 100 has been described. However, the present technology can of course be applied in the same manner as above to a case in which a plurality of transport streams are transmitted to another external device in a wired or wireless manner.

In addition, in the embodiment described above, the example in which the transport streams TS of MPEG are dealt with as streams is shown. However, the present technology can of course be applied in the same manner to another stream that has the same configuration as the streams.

The present technology may also be configured as below.
(1)
A transmission device including:
a stream input unit configured to input a plurality of streams each constituted of continuous packets;
a stream synthesizing unit configured to synthesize the plurality of input streams to obtain one stream; and
a stream transmission unit configured to transmit the one obtained stream,
wherein the stream synthesizing unit encodes at least a typical pattern portion of each packet of the plurality of streams using keys that are intrinsic to the respective streams for separation of packets of each stream on a reception side, and thereafter performs time-division multiplexing on the packets of the plurality of streams to obtain the one stream.

(2)
The transmission device according to (1), wherein the stream synthesizing unit further adds a header that includes a sync byte to each packet of the plurality of streams.

(3)
The transmission device according to (2), wherein the stream synthesizing unit further causes the header added to each packet of the plurality of streams to include a time stamp corresponding to an input time of the packet.

(4)
The transmission device according to any one of (1) to (3),
wherein the streams are transport streams, and
wherein the packets are transport stream packets each having a sync word as the typical pattern portion in a head.

(5)
The transmission device according to any one of (1) to (4), wherein the stream transmission unit transmits the one stream to an external device via a digital interface.

(6)
The transmission device according to (5), wherein the digital interface is a DVB-CI common interface.

(7)
A transmission method including:
a stream input step of inputting a plurality of streams each constituted of continuous packets;
a stream synthesizing step of synthesizing the plurality of input streams to obtain one stream; and
a stream transmission step of transmitting the one obtained stream,
wherein, in the stream synthesizing step, at least a typical pattern portion of each packet of the plurality of streams is encoded using keys that are intrinsic to the respective streams for separation of packets of each stream on a reception side, and thereafter the packets of the plurality of streams are time-division multiplexed to obtain the one stream.

(8)
A program that causes a computer to function as:
stream input means for inputting a plurality of streams each constituted of continuous packets;
stream synthesizing means for synthesizing the plurality of input streams to obtain one stream; and
stream transmission means for transmitting the one stream,
wherein the stream synthesizing means encodes at least a typical pattern portion of each packet of the plurality of streams using keys that are intrinsic to the respective streams for separation of packets of each stream on a reception side, and thereafter performs time-division multiplexing on the packets of the plurality of streams to obtain the one stream.

(9)
A reception device including:
a stream reception unit configured to receive one stream that is obtained by performing time-division multiplexing on packets of a plurality of streams;
a stream separation unit configured to separate the one received stream to obtain the plurality of streams; and
a stream output unit configured to output the plurality of obtained streams,
wherein at least a typical pattern portion of each packet of the plurality of streams constituting the one stream is encoded using keys that are intrinsic to the respective streams, and
wherein the stream separation unit decodes an encoded portion of each packet of the one stream using the keys that are intrinsic to the plurality of respective streams, and thereafter discards a packet whose typical pattern portion has not been correctly decoded, thereby obtaining the plurality of streams.

(10)
The reception device according to (9),
wherein a header that includes at least a sync byte is added to each packet of the one stream, and
wherein the stream separation unit detects and processes each packet included in the one stream based on the sync byte.

(11)
The reception device according to (10),
wherein the header added to each packet of the one stream further includes a time stamp, and
wherein the stream separation unit restores a timing of each packet included in the plurality of respective streams based on the time stamp after the packet is discarded.

(12)
The reception device according to any one of (9) to (11), wherein the stream reception unit receives the one stream from an external device via a digital interface.

(13)
The reception device according to (12), wherein the digital interface is a DVB-CI common interface.

(14)
A reception method including:
a reception step of receiving one stream that is obtained by performing time-division multiplexing on packets of a plurality of streams;
a stream separation step of separating the one received stream to obtain the plurality of streams; and
a stream output step of outputting the plurality of obtained streams,
wherein at least a typical pattern portion of each packet of the plurality of streams constituting the one stream is encoded using keys that are intrinsic to the respective streams, and
wherein, in the stream separation step, an encoded portion of each packet of the one stream is decoded using the keys that are intrinsic to the plurality of respective streams, a packet whose typical pattern portion has not been correctly decoded is thereafter discarded, and thereby the plurality of streams are obtained.

(15)
A program that causes a computer to function as:
stream reception means for receiving one stream that is obtained by performing time-division multiplexing on packets of a plurality of streams;
stream separation means for separating the one received stream to obtain the plurality of streams; and
stream output means for outputting the plurality of obtained streams,
wherein at least a typical pattern portion of each packet of the plurality of streams constituting the one stream is encoded using keys that are intrinsic to the respective streams, and
wherein the stream separation means decodes an encoded portion of each packet of the one stream using the keys that are intrinsic to the plurality of respective streams, and thereafter discards a packet whose typical pattern portion has not been correctly decoded, thereby obtaining the plurality of streams.

(16)
A stream transmission and reception system including:
a transmission device; and
a reception device, wherein the transmission device includes a stream input unit configured to input a plurality of streams each constituted of continuous packets, a stream synthesizing unit configured to synthesize the plurality of input streams to obtain one stream, and a stream transmission unit configured to transmit the one obtained stream to the reception device, wherein the stream synthesizing unit encodes at least a typical pattern portion of each packet of the plurality of streams using keys that are intrinsic to the respective streams for separation of packets of each stream on a reception side, and thereafter performs time-division multiplexing on the packets of the plurality of streams to obtain the one stream, wherein the reception device includes a stream reception unit configured to receive the one stream from the transmission device, a stream separation unit configured to separate the one received stream to obtain the plurality of streams, and a stream output unit configured to output the plurality of obtained streams, and wherein the stream separation unit decodes an encoded portion of each packet of the one stream using the keys that are intrinsic to the plurality of respective streams, and thereafter discards a packet whose typical pattern portion has not been correctly decoded, thereby obtaining the plurality of streams.

(17)
An electronic apparatus including:
a transmission device; and
a reception device, wherein the transmission device includes a stream input unit configured to input a plurality of streams each constituted of continuous packets, a stream synthesizing unit configured to synthesize the plurality of input streams to obtain one stream, and a stream transmission unit configured to transmit the one obtained stream to an external device, wherein the stream synthesizing unit encodes at least a typical pattern portion of each packet of the plurality of streams using keys that are intrinsic to the respective streams for separation of packets of each stream on a reception side, and thereafter performs time-division multiplexing on the packets of the plurality of streams to obtain the one stream, wherein the reception device includes a stream reception unit configured to receive the one stream that is obtained by performing time-division multiplexing on the packets of the plurality of streams from the external device, a stream separation unit configured to separate the one received stream to obtain the plurality of streams, and a stream output unit configured to output the plurality of obtained streams, wherein at least a typical pattern portion of each packet of the plurality of streams constituting the one stream is encoded using the keys that are intrinsic to the respective streams, and wherein the stream separation unit decodes an encoded portion of each packet of the one stream using the keys that are intrinsic to the plurality of respective streams, and thereafter discards a packet whose typical pattern portion has not been correctly decoded, thereby obtaining the plurality of streams.

(18)
The electronic apparatus according to (17), further including:
a storage configured to record at least one of the plurality of streams output from the stream output unit of the reception device.

(19)
The electronic apparatus according to (17), further including:

a processing device configured to perform a descrambling process on the plurality of streams output from the stream output unit of the reception device and to supply the plurality of processed streams to the stream input unit of the transmission device.

REFERENCE SIGNS LIST 10 digital broadcasting reception system
100 host device
101 microprocessor
102 clock generation unit
103-1, 103-2 tuner
104 transmission processing unit
105 reception processing unit
106-1, 106-2 demultiplexer
107 storage
108 changeover switch
109 MPEG decoder
141, 141-1, 141-2 header addition unit
141a controller
141b (4-byte) shift register
141c (3-byte) counter
141d (1-byte) memory
141e changeover switch
141f (192-byte) shift register
141g buffer
142, 142-1, 142-2 encoding unit
142a memory
142b exclusive-OR part (EX-OR unit)
143-1, 143-2 buffer
144 demultiplexer
151-1, 151-2 decoding unit
152-2, 152-2 packet discarding unit
153-1, 153-2 timing restoration unit
154-1, 154-2 header removal unit
155 processing unit
155a controller
155b changeover switch
155c (188-byte) shift register
155d (3-byte) shift register
155e (3-byte) counter
155f connection switch
200 CAM module
201 controller
202 reception processing unit
203-1, 203-2 descrambler
204 transmission processing unit

The invention claimed is:

1. A processing device comprising:
a plurality of tuners to input a plurality of streams each comprising packets;
a plurality of header addition units to add a header that includes a sync byte and a time stamp to each packet of the plurality of streams;
a plurality of encoders to encode a portion of each packet of the plurality of streams using keys that are particular to the respective streams for separation of packets of each stream on a reception side, in which an encoded portion of a respective packet is less than an entire portion of the respective packet such that at least a part of the respective packet is not encoded; and
a multiplexer to perform time-division multiplexing on the packets of the plurality of streams to obtain one stream.

2. The processing device according to claim 1, wherein the time stamp corresponds to an input time of the packet.

3. The processing device according to claim 1,
wherein the streams are transport streams, and
wherein the packets are transport stream packets each having a sync word as the encoded portion in a header.

4. The processing device according to claim 1, wherein the device is configured to cause the one stream to be transmitted to an external device via a digital interface.

5. The processing device according to claim 4, wherein the digital interface is a digital video interface.

6. A processing method comprising:
inputting a plurality of streams each comprising packets;
synthesizing the plurality of input streams to obtain one stream; and
transmitting the one obtained stream,
the synthesizing includes (i) adding a header that includes a sync byte and a time stamp to each packet of the plurality of streams, (ii) encoding a portion of each packet of the plurality of streams using keys that are particular to the respective streams for separation of packets of each stream on a reception side, in which an encoded portion of a respective packet is less than an entire portion of the respective packet such that at least a part of the respective packet is not encoded, and (iii) performing time-division multiplexing on the packets of the plurality of streams to obtain the one stream.

7. A non-transitory computer readable having a program stored thereon which when executed by a computer causes the computer to function as:
a number of tuners for inputting a plurality of streams each comprising packets;
a number of header addition units to add a header that includes a sync byte and a time stamp to each packet of the plurality of streams;
a plurality of encoders to encode a portion of each packet of the plurality of streams using keys that are particular to the respective streams for separation of packets of each stream on a reception side, in which an encoded portion of a respective packet is less than an entire portion of the respective packet such that at least a part of the respective packet is not encoded; and
a multiplexer to perform time-division multiplexing on the packets of the plurality of streams to obtain one stream.

8. A reception device comprising:
a demultiplexer to receive one stream that is obtained by performing time-division multiplexing on packets of a plurality of streams, in which each packet of the one stream includes a header having at least a sync byte and a time stamp, and (ii) to separate the one received stream to obtain the plurality of streams;
an output unit configured to output the plurality of obtained streams,
wherein a portion of each packet of the plurality of streams constituting the one stream is encoded using keys that are particular to the respective streams, in which an encoded portion of a respective packet is less than an entire portion of the respective packet such that at least a part of the respective packet is not encoded;
a number of decoding units to decode an encoded portion of each packet of the one stream using the keys that are particular to the plurality of respective streams; and
a number of packet discharging units to discard a packet whose coded portion has not been correctly decoded, thereby obtaining the plurality of streams.

9. The reception device according to claim 8,
wherein the device detects and processes each packet included in the one stream based on the sync byte.

10. The reception device according to claim 9,
wherein the device restores a timing of each packet included in the plurality of respective streams based on the time stamp after the packet is discarded.

11. The reception device according to claim 8, wherein the one stream is received from an external device via a digital interface.

12. The reception device according to claim 11, wherein the digital interface is a digital video interface.

13. A reception method comprising:
receiving one stream that is obtained by performing time-division multiplexing on packets of a plurality of streams, in which each packet of the one stream includes a header having at least a sync byte and a time stamp;
separating the one received stream to obtain the plurality of streams; and
outputting the plurality of obtained streams,
wherein a portion of each packet of the plurality of streams constituting the one stream is encoded using keys that are particular to the respective streams, in which an encoded portion of a respective packet is less than an entire portion of the respective packet such that at least a part of the respective packet is not encoded, and
wherein, in the separation, an encoded portion of each packet of the one stream is decoded using the keys that are particular to the plurality of respective streams, a packet whose encoded portion has not been correctly decoded is thereafter discarded, and thereby the plurality of streams are obtained.

14. A non-transitory computer readable having a program stored thereon which when executed by a computer causes the computer to function as:
a demultiplexer for receiving one stream that is obtained by performing time-division multiplexing on packets of a plurality of streams, in which each packet of the one stream includes a header having at least a sync byte and a time stamp, and for separating the one received stream to obtain the plurality of streams;
an output means for outputting the plurality of obtained streams,
wherein a portion of each packet of the plurality of streams constituting the one stream is encoded using keys that are particular to the respective streams, in which an encoded portion of a respective packet is less than an entire portion of the respective packet such that at least a part of the respective packet is not encoded;
a number of decoding units to decode an encoded portion of each packet of the one stream using the keys that are particular to the plurality of respective streams;
a number of packet discharging units to discard a packet whose encoded portion has not been correctly decoded, thereby obtaining the plurality of streams.

15. A stream processing and reception system comprising:
a processing device; and
a reception device,
wherein the processing device includes a plurality of tuners to input a plurality of streams each comprising packets, a number of header addition units to add a header that includes a sync byte and a time stamp to each packet of the plurality of streams, a number of encoder units to encode a portion of each packet of the plurality of streams using keys that are particular to the respective streams for separation of packets of each stream on a reception side, in which an encoded portion of a respective packet is less than an entire portion of the respective packet such that at least a part of the respective packet is not encoded, and a multiplexer to perform time-division multiplexing on the packets of the plurality of streams to obtain one stream, wherein the reception device includes a demultiplexer to receive the one stream from the transmission device and to separate the one received stream to obtain the plurality of streams, an output unit configured to output the plurality of obtained streams, a number of decoding units to decode an encoded portion of each packet of the one stream using the keys that are particular to the plurality of respective streams, and a number of packet discharging units to discard a packet whose encoded portion has not been correctly decoded, thereby obtaining the plurality of streams.

16. An electronic apparatus comprising:
a processing device; and
a reception device,
wherein the processing device includes a plurality of tuners to input a plurality of streams each comprising packets a number of header addition units to add a header that includes a sync byte and a time stamp to each packet of the plurality of streams, a number of encoder units to encode a portion of each packet of the plurality of streams using keys that are particular to the respective streams for separation of packets of each stream on a reception side, in which an encoded portion of a respective packet is less than an entire portion of the respective packet such that at least a part of the respective packet is not encoded, and a multiplexer to perform time-division multiplexing on the packets of the plurality of streams to obtain one stream, wherein the reception device includes a demultiplexer to receive the one stream that is obtained by performing time-division multiplexing on the packets of the plurality of streams from the external device and to separate the one received stream to obtain the plurality of streams, an output unit configured to output the plurality of obtained streams, wherein a encoded portion of each packet of the plurality of streams constituting the one stream is encoded using the keys that are particular to the respective streams, a number of decoding units to decode an encoded portion of each packet of the one stream using the keys that are particular to the plurality of respective streams, and a number of packet discharging units to discard a packet whose encoded portion has not been correctly decoded, thereby obtaining the plurality of streams.

17. The electronic apparatus according to claim 16, further comprising:
a storage configured to record at least one of the plurality of streams output from the output unit of the reception device.

18. The electronic apparatus according to claim 16, further comprising:
a device configured to perform a descrambling process on the plurality of streams output from the output unit of the reception device and to supply the plurality of processed streams to the stream input unit of the transmission device.

19. The processing device according to claim 4, further comprising a receiver configured to receive a descrambled stream from the external device.

20. A television set comprising:
a plurality of tuners to input a plurality of streams each comprising packets;
a number of header addition units to add a header that includes a sync byte and a time stamp to each packet of the plurality of streams;
a number of encoders to encode a portion of each packet of the plurality of streams using keys that are particular to the respective streams for separation of packets of each stream on a reception side, in which an encoded portion of a respective packet is less than an entire portion of the respective packet such that at least a part of the respective packet is not encoded; and
a multiplexer to perform time-division multiplexing on the packets of the plurality of streams to obtain one stream.

21. The processing device according to claim 1, wherein one or more of the header addition units comprise a controller and circuitry coupled to the controller, the controller configured to control operation of the circuitry.

22. The processing device according to claim 21, wherein the circuitry comprises a shift register, a byte counter, a memory, a changeover switch a shift byte register and a buffer.

23. The processing device according to claim 22, wherein the controller controls the changeover switch to selectively control communications between the shift register, the byte counter, or the memory and the shift register.

24. The processing device according to claim 21, wherein the controller comprises a microprocessor.

25. The reception device according to claim 8, wherein the reception device comprises a television receiver.

* * * * *